US010065888B2

(12) United States Patent
Schmitt et al.

(10) Patent No.: US 10,065,888 B2
(45) Date of Patent: Sep. 4, 2018

(54) METHOD OF ENHANCING THE LATENT HYDRAULIC AND/OR POZZOLANIC REACTIVITY OF MATERIALS

(71) Applicant: HEIDELBERGCEMENT AG, Heidelberg (DE)

(72) Inventors: Dirk Schmitt, Leimen (DE); Mohsen Ben Haha, Heidelberg (DE); Anca Itul, Heidelberg (DE); Maciej Zajac, Leimen (DE); Nicolas Spencer, Malsch (DE)

(73) Assignee: HEIDELBERGCEMENT AG, Heidelberg (DE)

( * ) Notice: Subject to any disclaimer, the term of this patent is extended or adjusted under 35 U.S.C. 154(b) by 0 days.

(21) Appl. No.: 14/787,012

(22) PCT Filed: May 7, 2014

(86) PCT No.: PCT/EP2014/001216
§ 371 (c)(1),
(2) Date: Oct. 26, 2015

(87) PCT Pub. No.: WO2014/183846
PCT Pub. Date: Nov. 20, 2014

(65) Prior Publication Data
US 2016/0075598 A1    Mar. 17, 2016

(30) Foreign Application Priority Data

May 11, 2013 (EP) .................. 13002496
Nov. 11, 2013 (EP) .................. 13005291
Nov. 28, 2013 (EP) .................. 13005528

(51) Int. Cl.
C04B 7/43 (2006.01)
C04B 22/00 (2006.01)
C04B 28/04 (2006.01)
C04B 7/345 (2006.01)
C04B 40/00 (2006.01)
C04B 7/14 (2006.01)
C04B 7/26 (2006.01)
C04B 28/08 (2006.01)
C04B 103/12 (2006.01)
C04B 103/14 (2006.01)

(52) U.S. Cl.
CPC ............ *C04B 22/0093* (2013.01); *C04B 7/14* (2013.01); *C04B 7/26* (2013.01); *C04B 7/345* (2013.01); *C04B 7/43* (2013.01); *C04B 28/04* (2013.01); *C04B 28/08* (2013.01); *C04B 40/0028* (2013.01); *C04B 2103/12* (2013.01); *C04B 2103/14* (2013.01); *Y02P 40/148* (2015.11)

(58) Field of Classification Search
CPC ........................................................ C04B 7/43
See application file for complete search history.

(56) References Cited

U.S. PATENT DOCUMENTS

2006/0260513 A1    11/2006  Porro Guiterrez et al.
2010/0151157 A1*   6/2010   Quadrio Curzio .... B09B 3/0041
                                                428/15

FOREIGN PATENT DOCUMENTS

| CN | 1232000 A | 10/1999 |
|----|-----------|---------|
| CN | 1420003 A | 5/2003 |
| CN | 1958499 A | 5/2007 |
| DE | 10 2005 037 771 B4 | 8/2007 |
| DE | 10 2009 018 632 B4 | 11/2011 |
| EP | 1 719 741 A1 | 11/2006 |
| EP | 2 243 754 A1 | 10/2010 |
| EP | 2 676 943 A1 | 12/2013 |
| EP | 2 878 585 A1 | 6/2015 |
| ES | 2 223 275 A1 | 2/2005 |
| FR | 2 940 274 A1 | 6/2010 |
| WO | WO 2007/017142 A2 | 2/2007 |
| WO | WO 2009/015769 A1 | 2/2009 |
| WO | WO 2009/015770 A1 | 2/2009 |
| WO | WO 2009/015771 A1 | 2/2009 |

OTHER PUBLICATIONS

International Search Report, PCT/EP2014/001216, Jun. 18, 2014, 2 pgs.
Ishida et al., "A-Dicalcium Silicate Hydrate: Preparation, Decomposed Phase, and Its Hydration", J. Am. Ceram. Soc., vol. 76, No. 7 (1993), pp. 1707-1712.
EPO communication pursuant to Rule 114(2) EPC, Appl. No. 13005528.8, Jul. 20, 2015, 15 pgs.
Guerrero et al., "Microstructure and Mechanical Performance of Belite Cements form High Calcium Coal Fly Ash", J. Am. Ceram. Soc., vol. 88, No. 7 (2005), pp. 1845-1853.
Jiang et al., "Hydrothermal Processing of New Fly Ash Cement", Ceramic Bulletin, vol. 71, No. 4 (1992), pp. 642-647.
Pimraksa et al., "Synthesis of belite cement from lignite fly ash", Ceram. Int., vol. 35 (2009), pp. 2415-2425.
Kacimi et al., "Synthesis of $\alpha'_L$ - $C_2S$ cement from fly-ash using the hydrothermal method at low temperature and atmoshpheric pressure", Journal of Hazardous Materials, vol. 181 (2010), pp. 593-601.

(Continued)

*Primary Examiner* — Anthony J Green
(74) *Attorney, Agent, or Firm* — Paul D. Strain, Esq.; Strain & Strain PLLC

(57) ABSTRACT

The present invention relates to a method of enhancing the latent hydraulic and/or pozzolanic reactivity of materials, especially of waste and by-products, comprising the steps: providing a starting material containing sources for CaO and at least one of $SiO_2$ and $Al_2O_3$ mixing the starting material with water at a water/solids ratio from 0.1 to 100 hydrothermal treating of the starting material mixed with water in an autoclave at a temperature of 100 to 300° C. and a residence time from 0.1 to 24 hours to provide an autoclaved product suitable as supplementary cementitious material.

31 Claims, 22 Drawing Sheets

(56) References Cited

OTHER PUBLICATIONS

Goni et al., "SEM/EDX characterization of the hydration products of belite cements from class C coal fly ash", J. Am. Ceram. Soc., vol. 90, No. 12 (2007), pp. 3915-3922.

Mazouzi et al., "Synthese d'un clinker belitique reactif a partir d'un melange de dechets industriels", XXIX$^e$ Rencontres Universitaires de Genie Civil, Tlemcen, May 29-31, 2011, pp. 411-418.

Stevulova et al., "Coal fly ash as raw material for low-energy belite cement preparing", Proc. of the 11th Int. Conf. on Environmental Science and Technology, Chania, Crete, Greece, Sep. 3-5, 2009, pp. B-908-B-914.

Stevulova et al., "Influence of Hydrothermal Pre-Treatment of Coal Fly on the Synthesis of Belite Phase", Journal of Environmental Science and Engineering, vol. 5 (2011), pp. 816-823.

Goni et al., "Study of alkaline hydrothermal activation of belite cements by thermal ananlysis", J. Am. Chem. Soc., vol. 90 (2007), pp. 3915-3922.

Goni et al., "An Eco-Efficient Method to Valorization of Solid Wastes: Hydrothermal Treatment", 1st Spanish National Conference on Advances in Materials Recycling and in Eco-Energy, Madrid, Nov. 12-13, 2009, pp. 119-122.

Barnes et al., "Composition of Portland Cement Belites", Cement and Concrete Research, vol. 8 (1978), pp. 559-564, Pergamon Press, Inc.

Berechnungsblätter zur Berechnung molarer Verhaltnisse aus chemischen Zusammensetzungen in Locher, Fylak, Barnes und Schneider, Oct. 27, 2016, 5 pgs.

Fylak, "Untersuchungen zum frühen Hydratationsverhalten von Portland- und Portlandkompositzementen", Dissertation Martin-Luther-Universität Halle-Wittenberg (2011), 225 pgs.

Garbev et al, "First Observation of $\alpha$-$Ca_2$[$SiO_3$(OH)](OH)-$Ca_6$[$Si_2O_7$][$SiO_4$](OH)$_2$Phase Transformation upon Thermal Treatment in Air", J. Am. Ceram. Soc., vol. 91, No. 1 (2008), pp. 263-271.

Ghosh, "Hydration of Polymorphs of Dicalcium Silicate", ii cement, vol. 3 (1985), pp. 139-146.

Gu et al., "A conduction calorimetric study of early hydration of ordinary Portland cement/high alumina cement pastes", J. Materials Science, vol. 32 (1997), pp. 3875-3881.

Hjorth et al, "Belite in Portland Cement", Cement and Concrete Research, vol. 1 (1971), pp. 27-40, Pergamon Press, Inc.

Ishida et al, "Innovative Processing for Cement Materials", Mrs Bulletin, Nov. 2001, pp. 895-898.

Jernejcic et al, "Thermal Decomposition of a-Dicalcium Silicate Hydrate", Thermochimica Acta, Vo;. 20 (1977), pp. 237-247.

Kim et al., "Influence of Minor Ions on the Stability and Hydration Rates of $\beta$-Dicalcium Silicate", J. Am. Ceram. Soc., vol. 87, No. 5 (2004), pp. 900-905.

Locher, "Zement: Grundlagen der Herstellung und Verwendung", Verlag Bau und Technik, Düsseldorf, (2000), p. 31 (Section 3.1), 2000.

Miyazaki et al., "Crystallographic Data of a New Phase of Dicalcium Silicate", J. Am. Ceram. Soc., vol. 81, No. 5 (1998), pp. 1339-1343.

Reschke et al, "Einfluβ der Granulometrie und Reaktivität von Zement und Zusatzstoffen auf die Festigkeits—und Geügeentwicklung von Mörtel und Beton", Betontechnische Berichte, Concrete Technology Reports 1998-2000, Verlag Bau+ Technik, Dusseldorf (2001), pp. 25-38.

Research Results Digest 382, "Measuring Cement Particle Size and Surface Area by Laser Diffraction", National Cooperative Highway Research Program, Apr. 2013, 24 pgs.

Schneider, "Charakterisierung von Zementbestandteilen", Conference Paper, Conference: Forschungskolloquium des Deutschen Ausschusses für Stahlbeton (DAfStb), Dusseldorf, vol. 41, Jul. 2002, 14 pgs.

Toraya et al., "Simulated annealing structure solution of a new phase of dicalcium silicate $Ca_2 SiO_4$ and the mechanism of structural changes from $\alpha$-dicalcium silicat hydrate to $\alpha_L$-dicalcium silicate via the new phase", Acta Cryst. vol. B58 (2002), pp. 613-621.

Zement-Taschenbuch, vol. 51 (2008), pp. 18-27 and 112-123, Düsseldorf, Verlag Bau+ Technik GmbH.

EPO Opposition, Appl. No. EP2801559, Nov. 2, 2016, 39 pgs.

\* cited by examiner

METHOD OF ENHANCING THE LATENT HYDRAULIC AND/OR POZZOLANIC REACTIVITY OF MATERIALS

CROSS-REFERENCE TO RELATED PATENT APPLICATIONS

This application is a National Stage of International Application No. PCT/EP2014/001216, filed May 7, 2014, which is based upon and claims the benefit of priority from prior European Patent Applications No. 13002496.1, filed May 11, 2013, Ser. No. 13/005,291.3, filed Nov. 11, 2013, and Ser. No. 13/005,528.8, Nov. 28, 2013, the entire contents of all of which are incorporated herein by reference in their entirety.

The present invention relates to a method of enhancing the latent hydraulic and/or pozzolanic reactivity of materials, especially waste and by-products to obtain useful supplementary cementitious materials that can be used as components in hydraulic binders.

The cement industry is one of the industries with a high energy demand. Clinker production as well as grinding are processes with high power consumption. Furthermore, natural raw materials are nowadays recognized as valuable and finite resources that should be preserved as much as possible. Last but not least, the total amount of $CO_2$ released by cement manufacturing accounts for 5-8% from the total man-made $CO_2$ emissions due to the huge amount of cement produced. Several approaches to reduce energy and raw material consumption as well as $CO_2$ emissions while covering the ever increasing demand for cement, concrete and other hydraulically setting building materials and products made therefrom are known.

Energy and natural raw materials are saved by using supplementary cementitious materials (abbreviated SCM) for substituting parts of the clinker in cement. Latent hydraulic materials, specifically ground granulated blast furnace slag, as well as natural and artificial pozzolans are widely used. Their use leads to a decreased amount of clinker being required. Thus, they are able to reduce both the energy and the natural raw materials consumption required per unit of building material. They reduce $CO_2$ emissions considerably, since decarbonation of limestone for clinker production is one of the steps mainly contributing to that. The problem with composite binders comprising SCMs is a retardation of strength development compared with the binder from "pure" clinker.

Further, the quality of materials used as SCM can vary significantly, especially as far as fly-ashes are concerned. For this reason, the amount of SCM in a composite binder is restricted. Lots of wastes and by-products are not suitable as SCM at all due to an insufficient pozzolanic or latent hydraulic reactivity, respectively. Thus, there is a need to optimize this approach both in respect of reactivity of the binders made with the cement as well as in the scope of materials used as SCM.

It is also well known to use wastes and by-products instead of the natural raw materials for producing clinker. The saving of natural resources is the primary advantage of that approach. Besides, using e.g. waste concrete as raw material also reduces the energy demand, since decarbonation of limestone is one of the chemical processes contributing significantly to the high overall energy demand. However, in comparison to a use of the same materials as SCM, i.e. without a process of burning them to clinker, the energy required in a use as raw material is much higher, which is undesirable.

A last proposal is the search for alternative materials showing the desired hydraulic reactivity for completely substituting classical cement like Portland cement or calcium aluminate cement. To this end cements with belite as main phase have been developed. Since they use much less or no limestone, they reduce $CO_2$ emission.

Specifically, it is generally known to provide belite based hydraulically reactive materials as alternative to Portland cement by hydrothermal treatment and calcining of materials containing $SiO_2$ and $CaO$ and sometimes also $Al_2O_3$ and/or $Fe_2O_3$, see e.g. H. Ishida et al., "alpha Dicalcium Silicate Hydrate: Preparation, Decomposed Phase, and its Hydration", J. Am. Chem. Soc. 76, p. 1707-1712, 1993; Jiang et al., "Hydrothermal Processing of New Fly-ash Cement", Ceramic Bulletin 71, p. 642-647, 1992; Pimraksa et al., "Synthesis of belite cement from lignite fly-ash", Ceram. Int. 35, p. 2415-2425, 2009; Kacimi et a., "Synthesis of $\alpha'_L$-$C_2S$ cement from fly-ash . . . ", J. Haz. Mat., 181, p. 593-601, 2010; S. Goni and A. Guerrero in $1^{st}$ Spanish National Conference on Advances in Materials Recycling and in Eco-Energy, Madrid, 12-13 Nov. 2009, p. 119-122 and in J. Am. Chem. Soc. 90, p. 3915-3922, 2007; ES 2 223 275; Mazouzi et al., "Synthese d'un clinker belitique reactif a partir d'un melange de dechets industriels", $XXIX^e$ Rencontres Universitaires de Genie Civil, Tlemcen, 29-31. May 2011, p. 411-418; Stevulova et al., "Coal fly ash as raw material for low energy belite cement preparing", Proc. of the $11^{th}$ Int. Conf. on Environmental Science and Technology, Chania, 3.-5. September 2009, p. B-908-B-914; and Stevulova et al., "Influence of Hydrothermal Pre-Treatment of Coal Fly on the Synthesis of Belite Phase", J. of Environ. Science and Engineering 5, p. 816-823, 2011.

Most of these proposals use fly-ash predominantly combined with lime or hydrated lime to add enough CaO. The aim is always provision of a product useful as cement itself, mainly belite cement is obtained. The proposals mostly require a high temperature heating step, typically using at least 800° C., for converting the hydrates produced by hydrothermal treatment into hydraulically reactive phases, i.e. a cement. Such new cements are not readily accepted in the building industry. Without any regulation by a standard or a specific official approval the building industry cannot apply a new product. Changing a standard is a time consuming and tedious process. Obtaining an official approval also requires time and incurs costs. In summary, depending on the method of making them, the alternative cements may still need valuable natural raw materials and/or a considerable amount of energy. Completely novel cements have the draw back of lacking standards and/or approvals to be widely used instead of Portland cement.

It was now found that application of the steps hydrothermal treatment and preferably subsequent tempering at 350 to 600° C., i.e. a temperature lower than deemed useful for providing belite cement according to the literature mentioned, surprisingly enables a significant activation of wastes and by-products. In this way, they can be used to make composite binders for which a standard, for example EN 197, is established. None of the prior proposals considers using the product obtained by hydrothermal treatment—with or without a subsequent heating step—as supplementary cementitious material, i.e. mixing it with Portland cement (OPC) to obtain a composite binder or as component of established alternative binders like super sulphated cement. Instead they aimed at providing completely novel cements.

The invention thus solves the above object by a method of enhancing the latent hydraulic and/or pozzolanic reactivity of materials, especially wastes and by-products, comprising the steps:

providing a starting material, preferably from one or more waste(s) and/or by-product(s), containing sources for CaO and at least one of $SiO_2$ and $Al_2O_3$ mixing the starting material with water at a water/solids ratio from 0.1 to 100 and hydrothermal treating of the starting material mixed with water in an autoclave at a temperature of 100 to 300° C., a pressure of 0.5-5 MPa and a residence time from 0.1 to 50 hours to provide an autoclaved product.

Preferably, the method further comprises the step of tempering the autoclaved product at a temperature from 350 to 600° C., wherein the heating rate ranges from 10 to 6000° C./minute and the residence time ranges from 0.01 to 600 minutes to provide an autoclaved and tempered product. Both, the autoclaved and the autoclaved and tempered product are useful as supplementary cementitious material and show enhanced reactivity compared to the starting material. In some instances herein both are summarized as SCM according to the invention or SCM obtained according to the invention.

In the context of this invention "reactive" means a hydraulic, latent hydraulic or pozzolanic reactivity, unless indicated otherwise. A material has hydraulic reactivity when a paste made from the finely ground material by mixing it with water sets and hardens because of hydration reactions wherein the hardened product retains its soundness, strength and durability in air and under water. A material has latent hydraulic reactivity when it is able to undergo hydration reaction upon mixing with water, but needs an activation to harden hydraulically in a commercially acceptable period of time. A material has pozzolanic reacitivity, when upon mixing with water at normal temperatures it can only set and harden in the presence of an activator e.g. potassium hydroxide, sodium hydroxide or calcium hydroxide (as cement pore solution is essentially made of). The $OH^-$ attacks the silicon or the $Al_2O_3$—$SiO_2$ network with following breaking of bonds between the oxygen and the networking-forming atoms. However, the distinction between latent hydraulic and pozzolanic is not always applied strictly, for the present invention the distinction is not important.

Cement is used herein to designate a finely ground material that shows hydraulic reactivity. A cement can be used as such as a binder, typically a binder contains cement and further components like SCM and/or additives. A binder comprising a cement and one or more SCM(s) is designated composite binder. A binder can also be made of an SCM and an activator, in this instance the combination of the SCM and the activator is a cement.

There are different criteria for judging whether a material can be used as latent hydraulic or pozzolanic component in a cement or binder. Generally, it is only the glassy part of a material that shows reactivity, so a high crystallinity renders a material less useful or unusable. The chemical composition also underlies restrictions, e.g. organic components should not be contained. According to Ullmann, $7^{th}$ Edition, WILEY VCH Verlag GmbH & Co KGaA, a slag has to have at least two thirds glass content and the ratio by mass $(CaO+MgO)/SiO_2$ shall exceed 1, a natural pozzolan shall have not less than 25% reactive silica content. One quantitative criterium for usefulness is the strength activity index, which can be determined according to ASTM C 311-05. In the context of the present invention heat flow measurements are used as indicator for reactivity. Generally, a fast heat development and/or high cumulative heat release within short times indicates a high reactivity that correlates with fast strength development.

The materials, especially wastes and by-products, that can be provided with enhanced reactivity according to the invention are numerous. Especially low quality by-products e.g crystalline and/or having low hydration activity indices can now be used. There are numerous materials that are less useful as SCM or even not usable as SCM at all in the form they occur. SCMs that are useful also benefit from an enhanced reactivity, they can be used in bigger amounts or the binder shows improved reactivity, for example. Typical examples for starting materials are high-calcium fly ash, low-calcium fly ash, incineration ash from combustion of municipal wastes both solid and liquid, bottom ash, slag, quartz, sand, gravel, used concrete, asbestos and mixtures of two or more of them.

The starting materials ideally contain $SiO_2$ and CaO, and may contain $Al_2O_3$ and/or $Fe_2O_3$. Other compounds of these elements are likewise possible. The molar ratio of calcium (and magnesium if present) to the sum of silica, alumina, and iron oxide should preferably range from 1.0 to 3.5, more preferred from 1.5 to 2.5 and most preferred be about 2. If present, the ratio of the sum of aluminium and iron to silicon ranges from 0.01 to 100. For a high aluminium content a ratio of 100 to 10 is preferred, for a medium aluminium content from 1 to 20 and for a low aluminium content from 0.01 to 2. Compounds that are inert during the method are taken into account for calculation of the ratios.

A raw material could have the desired composition on its own, if not, the desired ratios can be adjusted by adding further reaction partners before treatment begins. For increasing CaO content e.g., but not exclusively, portlandite, or burned limestone, ashes with high CaO content (either free lime or chemically bound Ca), as well as granulated blast furnace slag are suitable.

As a rule the starting materials are optimized with regard to particle size and particle size distribution. To this end mechanical and thermal treatments are useful, wherein thermal treatments can also improve/optimize the (chemical) mineralogical composition. Examples for treatments are burning of carbon (e.g. in ashes) or conversion of non reactive phases to reactive compounds, like $SiO_2$ or $C_2AS$ into $C_2S$, which in turn can improve conversion within the autoclave. In the case of asbestos a thermal pre-treatment is applied to change the hazardous particle form into non-hazardous forms.

In a preferred embodiment a starting material is chosen or provided by pre-treatment that has a maximum grain size of 0.1 mm or below. For this especially the finer grain fractions from recycling cementitious binders in building materials such as used concrete and used cement are applied. A finer starting material is beneficial with regard to conversion rate as well as with regard to grinding effort for the SCM according to the invention. With a sufficiently fine starting material a grinding after the hydrothermal treatment (and tempering, if applicable) can be superfluous. An activating by intensive grinding is not necessary and does not take place.

Preferably, further elements or oxides in an amount of 0.1 to 30% by weight are added while mixing the starting materials or in a subsequent step. Sodium, potassium, boron, sulphur, phosphorous or a combination thereof are preferred as further elements/oxides, wherein further elements/oxides are together also designated foreign oxides. Useful are alkaline and/or earth alkaline salts and/or hydroxides, for example, but not exclusively, $CaSO_4.2H_2O$, $CaSO_4.\frac{1}{2}H_2O$, $CaSO_4$, $CaHPO_2.2H_2O$, $Ca_3P_2O_8$, $NaOH$, $KOH$, $Na_2CO_3$, $Na_2HCO_3$, $K_2CO_3$, $MgCO_3$, $MgSO_4$, $Na_2Al_2O_4$, $Na_3PO_4$, $K_3PO_4$, $Na_2[B_4O_5(OH)_4].8H_2O$, $CaCl_2$, $Ca(NO_3)_2$, $MgCl_2$, $Mg(NO_3)_2$, $AlCl_3$, $Al(NO_3)_3$, $FeCl_3$, $Fe(NO_3)_3$, $Ca(CH_3COO)_2$, $Mg(CH_3COO)_2$, $Al(CH_3COO)_3$, $Ca(HCOO)_2$, $Mg(HCOO)_2$, $Al(HCOO)_3$, and mixtures of two or more of them. In a preferred embodiment the starting material mixture has a molar ratio P/Si of about 0.05 and/or S/Si of about 0.05 and/or Ca/K of about 0.05.

The starting material mixture, optionally pre-treated as described, can optionally be mixed, i.e. seeded, with seed crystals, which e.g. contain calcium silicate hydrate, Portland clinker, granulated blast furnace slag, magnesium silicates, calcium sulphate aluminate (belite) cement, sodium silicate, glass powder and so on. Hereby, the reaction can be accelerated by seeding with from 0.01 to 30% by weight seed crystals, especially differing calcium silicate and calcium silicate hydrate compounds, especially with $\alpha$-$2CaO.SiO_2.H_2O$, afwillite, calciochondroitite, $\alpha$- and $\beta$-$Ca_2SiO_4$ and other compounds.

The produced starting material mixture, which is optionally seeded as described above, is subsequently subjected to a hydrothermal treatment in an autoclave at a temperature from 100 to 300° C., preferably from 150 to 250° C. Hereby, a water solids ratio from 0.1 to 100, preferably from 2 to 20 is chosen. The residence time is preferably 0.1 to 50 hours, preferred are 10 to 40 hours, most preferred 16 to 32 hours.

Hydrothermal treatment converts the starting mixture into an autoclaved product containing calcium silicate hydrates or calcium aluminium hydrates, and optionally calcium aluminium silicate hydrate or magnesium silicate hydrate or calcium magnesium silicate hydrate or magnesium (aluminium, iron) silicate hydrate or magnesium (calcium, aluminium, iron) silicate and other compounds.

The autoclaved product contains at least one, usually several of the mentioned calcium and/or magnesium silicate or aluminate hydrates, typically:
- 0.01 to 80% by weight $\alpha$-$C_2SH$, differing C-S-H forms including dellaite and partially carbonated C-S-H phases as well as amorphous and ill crystalline phases thereof
- 0.01 to 80% by weight katoite, Si-katoite, Fe-katoite, also as mono- and semi carbonate as well as amorphous and ill crystalline phases thereof
- 0.01 to 80% by weight magnesium (calcium, aluminium, iron) silicates or silicate hydrates as well as amorphous and ill crystalline phases thereof
- 0.01 to 80% by weight aluminium and/or iron silicates and silicate hydrates as well as amorphous and ill crystalline phases thereof
- traces and secondary components such as alumina, iron oxide (hematite, magnetite) and aluminium or iron hydroxides, $C_2AS$, $Ca(OH)_2$, $MgCO_3$, $Mg(OH)_2$, quartz, cristobalite, anhydrite and calcite.

Generally, the amorphous and ill crystalline phases are a precursor of the crystalline phases, for example calcium silicates (belite), calcium aluminates (mono calcium aluminates, mayenite), magnesium (aluminium, iron) silicates (serpentine, talc), and so on, which have no or only a low atomic (short-range) order. This is reflected in a lack of forming X-ray reflexes or the formation of very much broadened reflexes with low intensity. A good example for this is granulated blast furnace slag with high amorphous content (>95%). A very pronounced so called glassy hill ("Glasbuckel") over a 2θ range on which the main peak(s) of the crystalline phases, e.g. akermannite or gehlenite, are situated, depending on chemical composition. The degree of crystallinity depends from several parameters, like for example the kind of starting material, the temperature, the pressure and the built-in foreign ions.

The autoclaved product is preferably subsequently tempered at a temperature from 350 to 600° C. Heating rates are from 10 to 6000° C./minute, preferably from 20 to 100° C./minute and especially preferred about 40° C./minute. Residence times from 0.01 to 600 minute, preferably from 1 to 120 minutes and especially preferred from 5 to 60 minutes are applied. No high intensity grinding takes place.

The temperature for tempering is preferably 400 to 550° C., especially preferred 400 to 495° C. The higher the temperature during tempering, the lower is the preferred residence time. Tempering temperatures below 500° C. provide an especially reactive material, higher tempering temperatures are possible, however, and can make sense depending on the starting material. The tempering temperature and time should be chosen such that as much autoclaved material as possible is converted. On the other hand, the temperature should be as low as possible, since reactivity of the product is higher and this also restricts the necessary energy and thereby the cost and the environmental impact.

After cooling, the product obtained comprises at least one calcium silicate or at least one calcium aluminate and at least one X-ray amorphous phase. Usually, the product comprises the following components:
- 1 to 95% by weight reactive calcium aluminates, preferably in the form of crystalline $C_{12}A_7$ or ill crystalline or amorphous aluminate phases
- 1 to 80% by weight magnesium (calcium, aluminium, iron) silicates, in the form of crystalline or ill crystalline or amorphous phases, that can contain foreign ions like Fe, Al, Ca
- 1 to 80% by weight $C_2S$ polymorphs, in the form of crystalline or ill crystalline or amorphous phases
- 1 to 80% by weight calcium aluminium silicates, in the form of crystalline or ill crystalline or amorphous phases
- 1 to 80% by weight calcium magnesium aluminium silicates, in the form of crystalline or ill crystalline or amorphous phases
- up to 30% by weight traces or minor components, especially $C_5A_3$, CA, calcium oxide, γ alumina and other aluminas, quartz, cristobalite and/or limestone, CaO, calcium sulphate, $MgCO_3$, $Mg(OH)_2$, $Fe_2O_3$, iron silicates such as $Fe_2SiO_4$, amorphous iron containing phases and
- 0 to 30% by weight hydrates from the hydrothermal treatment, wherein all amounts of the product sum up to 100% and the sum of calcium silicates, calcium aluminates, calcium aluminium silicates, magnesium silicates and calcium magnesium silicates is at least 30% by weight, preferably at least 50% by weight and most preferred at least 70% by weight.

Provided that the fineness of the autoclaved or autoclaved and tempered product is already sufficient (use of fine raw materials with suitable particle size distribution), this product is already the desired activated SCM. If the fineness is insufficient or a binder with exceptionally high fineness is desired, the product can be ground in a manner known per se, with or without additions, to the desired fineness or particle size distribution, respectively. A suitable fineness is e.g. from 2000 to 10.000 $cm^2/g$ (Blaine).

The product is especially useful as SCM for composite binders. It can also be used for other cements/binders containing latent hydraulic and/or pozzolanic materials, like supersulphated cement, geopolymer binders.

A composite binder contains the SCM according to the invention and one or more ground clinker(s), preferably Portland cement or Portland cement clinker. It can further contain fly-ash or ground granulated blast furnace slag according to the prior art (i.e. not activated according to the invention), metakaolin and/or limestone. The components can be mixed in finely ground form or mixed and then ground together. The amount of the one or more SCMs preferably ranges from 1 to 99% by weight, more preferred from 5 to 70% by weight, and most preferred from 10 to 30% by weight. The amount of Portland cement and/or Portland cement clinker preferably ranges from 1 to 99% by weight, more preferred from 30 to 95% by weight, and most preferred from 70 to 90% by weight. Both relate to the sum of SCM(s) and Portland cement (clinker).

A super sulphated cement contains the SCM, sulphate and an alkaline compound, typically OPC. Generally it contains about 80% by weight SCM, 15% by weight sulfate and 5% by weight OPC.

The BET surface of the SCM according to the invention and/or of the binder should range from 1 to 30 m$^2$/g. The water content of the SCM according to the invention is typically 20% by weight or less, preferably less than 15% by weight and especially preferred less than 10% by weight.

The binder can be used in combination with all admixtures such as water-reducers and set controlling admixtures e.g. polycarboxylate ether-based superplasticizers, corrosion-inhibiting admixtures, shrinkage-reducing admixtures, air-entraining admixtures etc. in the usual amounts. Also additives like fibres, stone dust and so on can be comprised.

The binder can be used for concrete making, for pre-cast units, such as panels, beams, road furniture, or cast-in situ concrete such as building superstructures, roads, dams. The binder can also be used in mortars, for plasters and screeds, and in grouts (consolidate foundations, road-beds, etc.).

The method according to the invention provides SCMs with high amounts of hydraulically reactive phases like $C_2S$, $C_{12}A_7$, magnesium silicates and amorphous phases. They are characterized by comprising highly reactive polymorphs of $C_2S$, highly reactive magnesium (calcium, aluminium, iron) silicates, $C_{12}A_7$ and X-ray amorphous as well as ill crystalline phases.

In contrast to the prior methods of hydrothermal treatment of raw materials containing aluminium the temperature during tempering is restricted to below 600° C., preferably to below 550° C. and especially preferred to below 500° C., so that very reactive polymorphs of $C_2S$, Mg containing phases, $C_{12}A_7$ and others are obtained as well as X-ray amorphous phases. Thereby a high reactivity and an exceptionally fast hydration and strength development based on the formed calcium and magnesium silicate hydrates and calcium aluminate hydrates is achieved.

The invention will be illustrated further with reference to the examples that follow, without restricting the scope to the specific embodiments described. If not otherwise specified any amount in % or parts is by weight and in the case of doubt referring to the total weight of the composition/mixture concerned.

The invention further includes all combinations of described and especially of preferred features that do not exclude each other. A characterization as "approximately", "around" and similar expression in relation to a numerical value means that up to 10% higher and lower values are included, preferably up to 5% higher and lower values, and in any case at least up to 1% higher and lower values, the exact value being the most preferred value or limit.

BRIEF DESCRIPTION OF THE DRAWINGS

The invention will be explained in further detail below on the basis of exemplary embodiments and with reference to the drawings, in which.

EXAMPLE 1

10 g of slag were added to water (water-to-solid (w/s) of 10) and hydrothermally treated at 185° C. and 1.1 MPa for 16 h once or twice in a stainless steel autoclave. 2% NaOH (solid/solid) was added to the solution before each autoclaving step to promote the dissolution of the glassy phases. The products obtained after 16 h and after 32 h autoclaving were tempered for 1 h directly at 500° C.

The chemical composition including the loss on ignition at 1050° C. (LOI) of the used slag designated "G" is given in table 1. This slag is unsuitable as SCM due to its high content of crystalline phases.

TABLE 1

| Component | amount [%] |
|---|---|
| $SiO_2$ | 37.67 |
| $Al_2O_3$ | 8.76 |
| $TiO_2$ | 0.35 |
| MnO | 0.41 |
| $Fe_2O_3$ | 0.22 |
| CaO | 40.52 |
| MgO | 7.55 |
| $K_2O$ | 0.66 |
| $Na_2O$ | 0.45 |
| $SO_3$ | 2.18 |
| $P_2O_5$ | 0.01 |
| Amorphous | 79.24 |
| Free lime | 0.00 |
| LOI | 0.25 |

Figure 1A:
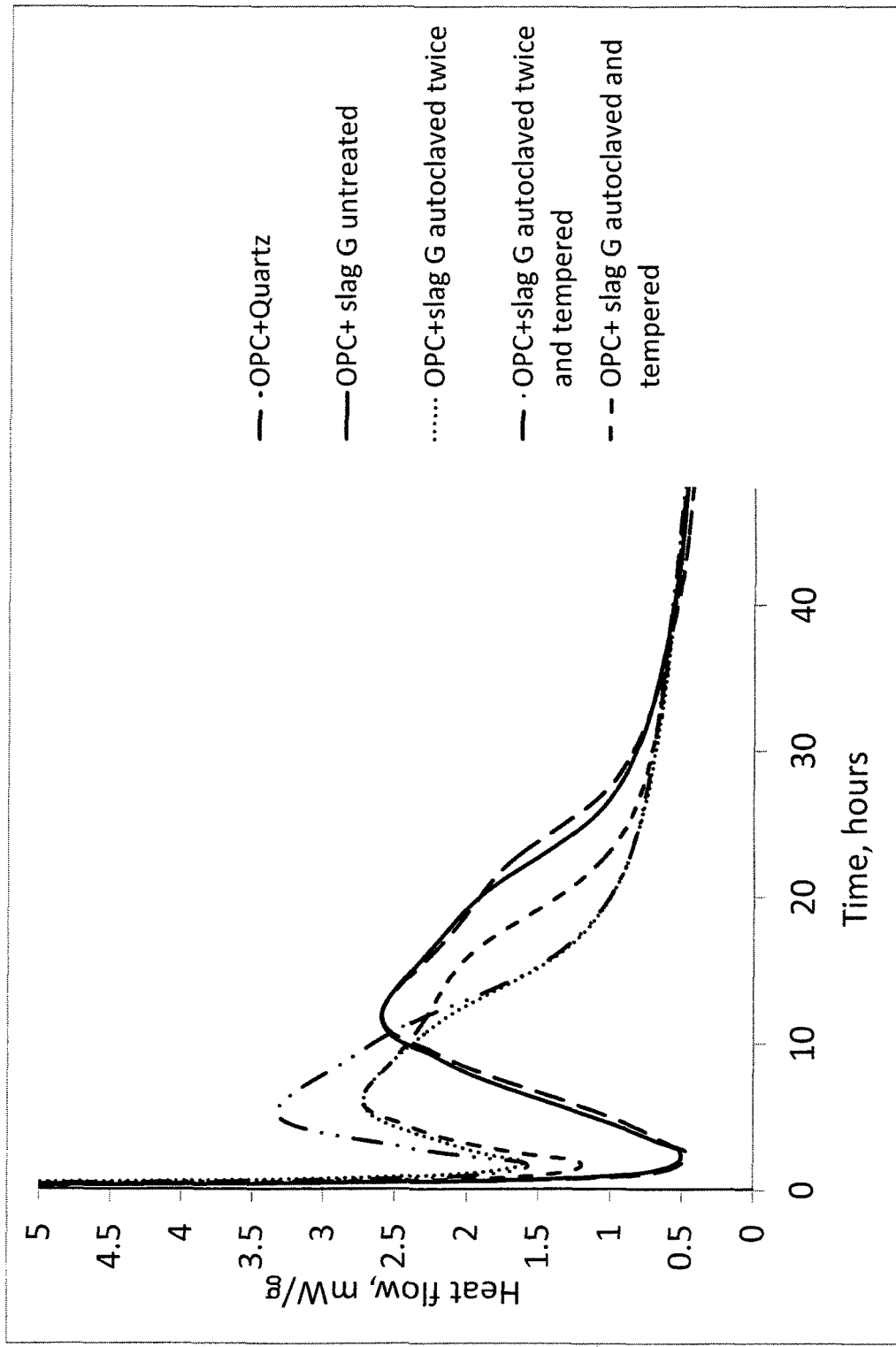
FIG. 1a shows measured heat flow according to Example 1.
Figure 1B:
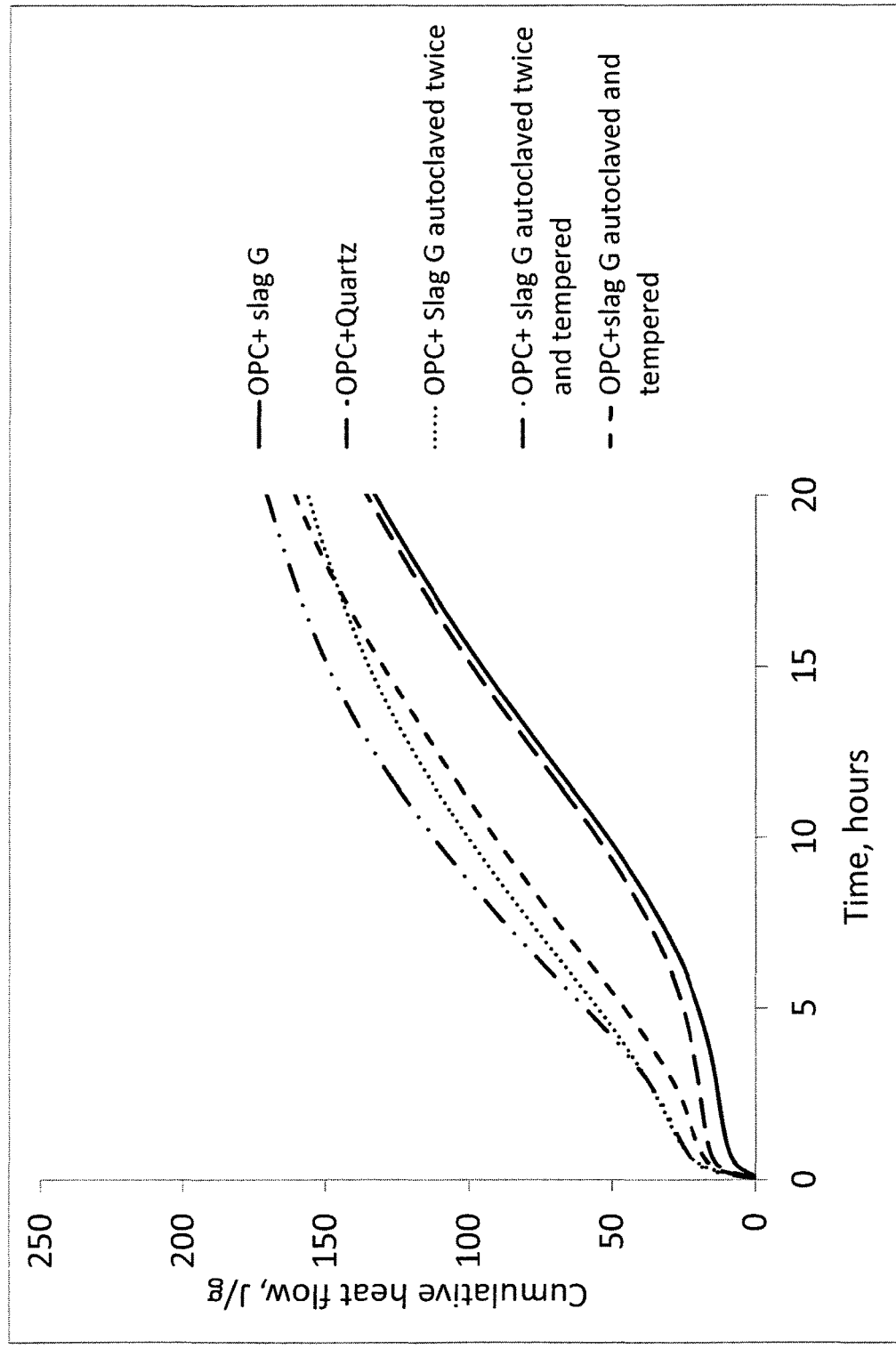
FIG. 1b shows cumulative heat flow according to Example 1.

Mixes of 70% OPC and 30% hydrothermally treated slag or of 70% OPC and 30% hydrothermally treated and tempered slag were mixed with water (water-to solid ratio of 0.5) and the heat flow development was measured by isothermal calorimetry (TAM Air, TA Instruments, Sweden) The results were compared to the heat flow recorded for mixes of 70% OPC and 30% non-treated slag and 70% OPC and 30% quartz. The measured heat flow and the cumulated heat flow are shown in FIGS. 1a and 1b.

The heat evolution curves indicate a significant accelerating effect for blends of OPC and hydrothermally treated material compared to blends of OPC with untreated material. Mixes of OPC with hydrothermally treated slag show a maximum rate of the heat release shifted to the left and a faster onset of the acceleration period. Subsequent tempering further increases the reactivity of the hydrothermally treated product and results in greater maximal values for the main heat peak release. In terms of cumulative heat release, after 8 h the heat output for the blends of OPC with hydrothermally treated and tempered slag are three fold higher compared to blends of OPC with untreated slag. The values remain greater after 7 days. This clearly shows the benefit that hydrothermal treatment and hydrothermal treatment followed by tempering has on the poorly reactive slags.

EXAMPLE 2

10 g of slag were added to water (water-to-solid (w/s) of 10) and hydrothermally treated at 185° C. for 16 h and 1.1 MPa in a stainless steel autoclave. 2% NaOH (solid/solid) was added to the solution before the autoclaving step to promote the dissolution of the glassy phases. The autoclaved product obtained was tempered for 1 h directly at 500° C.

The chemical composition including the loss on ignition at 1050° C. (LOI) of the used slag designated "V" is given in table 2. This slag has a low reactivity.

TABLE 2

| Component | amount [%] |
|---|---|
| $SiO_2$ | 38.74 |
| $Al_2O_3$ | 11.16 |
| $TiO_2$ | 0.49 |
| MnO | 1.16 |
| $Fe_2O_3$ | 0.58 |
| CaO | 35.14 |
| MgO | 8.51 |
| $K_2O$ | 1.09 |
| $Na_2O$ | 0.33 |
| $SO_3$ | 1.98 |
| $P_2O_5$ | 0.00 |
| Amorphous | 89.18 |

TABLE 2-continued

| Component | amount [%] |
|---|---|
| Free lime | 0 |
| LOI | 1.29 |

Figure 2A:
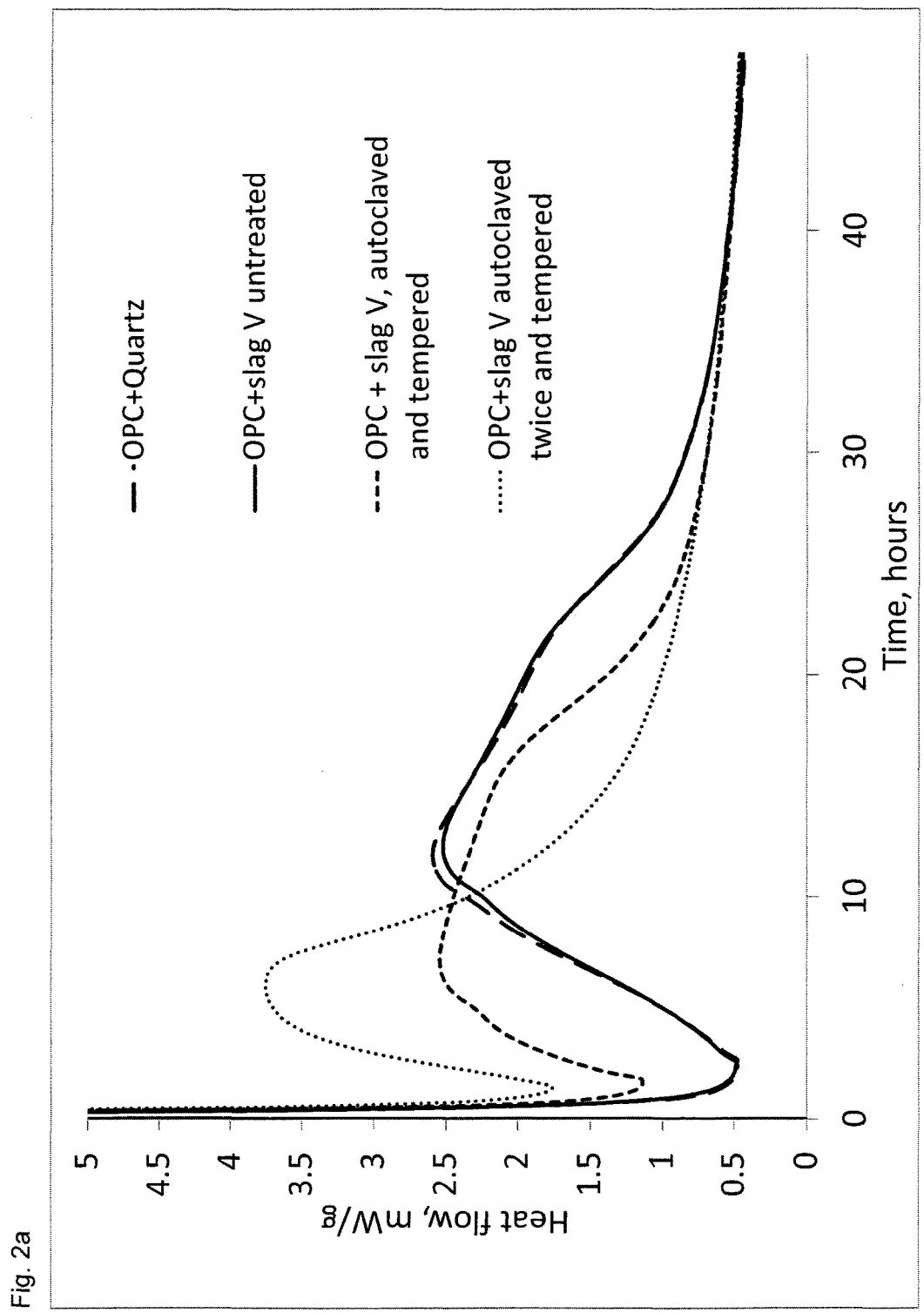
FIG. 2a shows measured heat flow according to Example 2.
Figure 2B:
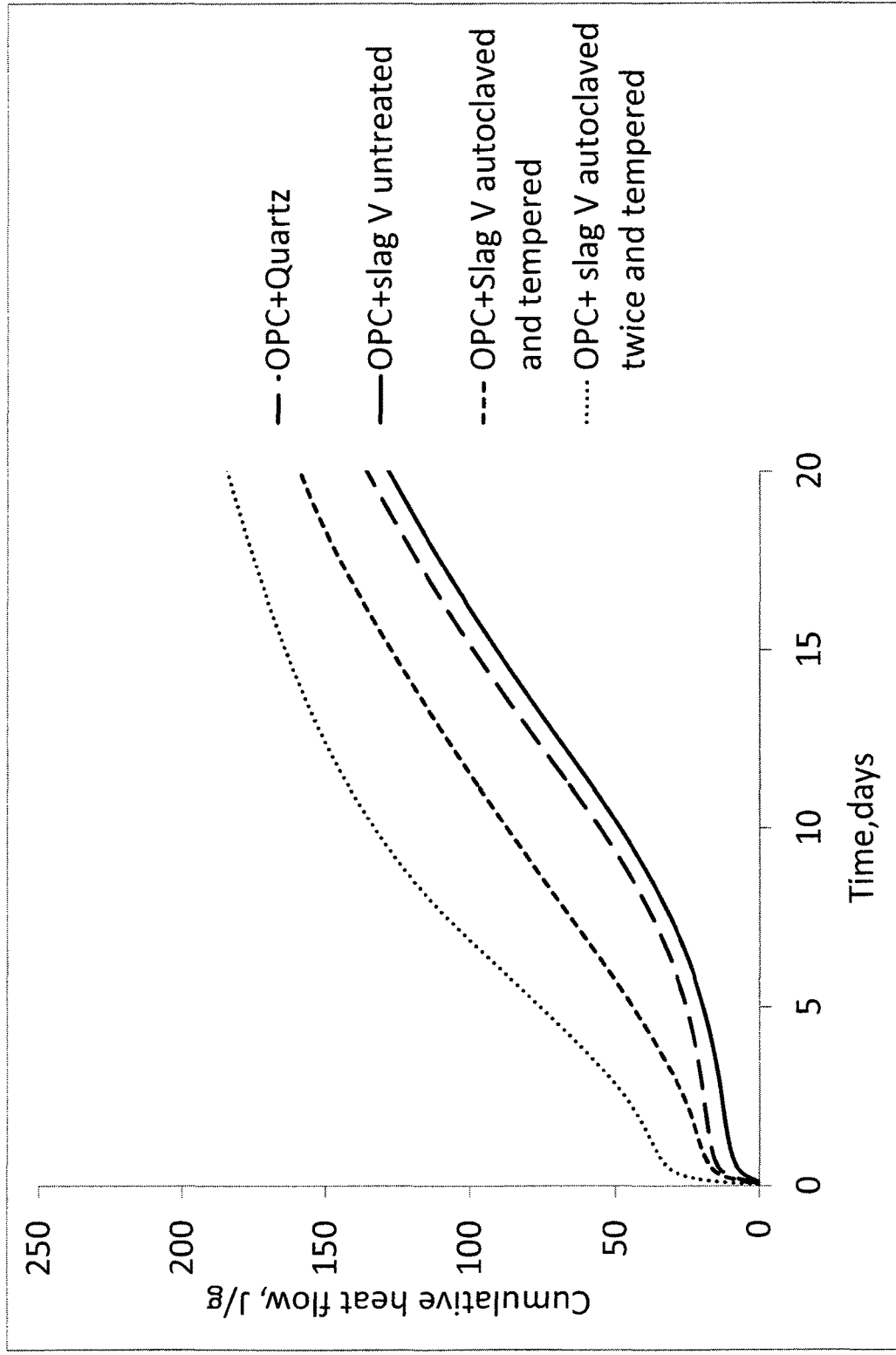
FIG. 2b shows cumulative heat flow according to Example 2.

Mixes of 70% OPC and 30% hydrothermally treated slag or of 70% OPC and 30% hydrothermally treated and tempered slag were mixed with water (water-to solid ratio of 0.5) and the heat flow development was measured by isothermal calorimetry (TAM Air, TA Instruments, Sweden). The results were compared to the heat flow recorded for mixes of 70% OPC and 30% non-treated slag and 70% OPC and 30% quartz. The measured heat flow and cumulative heat flow are shown in FIGS. 2a and 2b.

The heat evolution curves indicate a significant accelerating effect for blends of OPC with treated material compared to blends of OPC with untreated material. Mixes of OPC with hydrothermally treated and tempered slags show a maximum rate of the heat release shifted to the left and a faster onset of the acceleration period. The maximum rate of the heat release shifts to the left with extended duration of the hydrothermal step.

In terms of cumulative heat release, after 8 h the heat output for the blends of OPC with hydrothermally treated and tempered slags are two and three fold higher (three fold higher when the autoclaving step is repeated) compared to blends of OPC with untreated slag. After 16 h autoclaving the heat release values for modified systems are higher by 38% and 75% respectively for mixes of OPC and hydrothermally treated slag with subsequent tempering. The values remain greater after 7 days. This clearly shows the benefit that hydrothermal treatment and hydrothermal treatment followed by tempering has on the poorly reactive slags.

EXAMPLE 3

10 g of slag were added to water (water-to-solid (w/s) of 10) and hydrothermally treated at 185° C. for 16 h and 1.1 MPa in a stainless steel autoclave. 2% water glass ($Na_2O.SiO_2$) (solid/solid) was added to the solution before the autoclaving step to promote the dissolution of the glassy phases. The autoclaved product obtained was tempered for 1 h directly at 500° C.

The chemical composition including the loss on ignition at 1050° C. (LOI) of the used slag designated "E" is given in table 3. This slag is a fairly reactive material, but lacks ideal reactivity.

TABLE 3

| Component | amount [%] |
|---|---|
| $SiO_2$ | 34.97 |
| $Al_2O_3$ | 11.42 |
| $TiO_2$ | 1.11 |
| MnO | 0.27 |
| $Fe_2O_3$ | 0.46 |
| CaO | 41.64 |
| MgO | 5.72 |
| $K_2O$ | 0.48 |
| $Na_2O$ | 0.08 |
| $SO_3$ | 3.04 |
| $P_2O_5$ | 0.03 |
| Amorphous | 44.6 |
| Free lime | 0.00 |
| LOI | 1.30 |

Figure 3A:
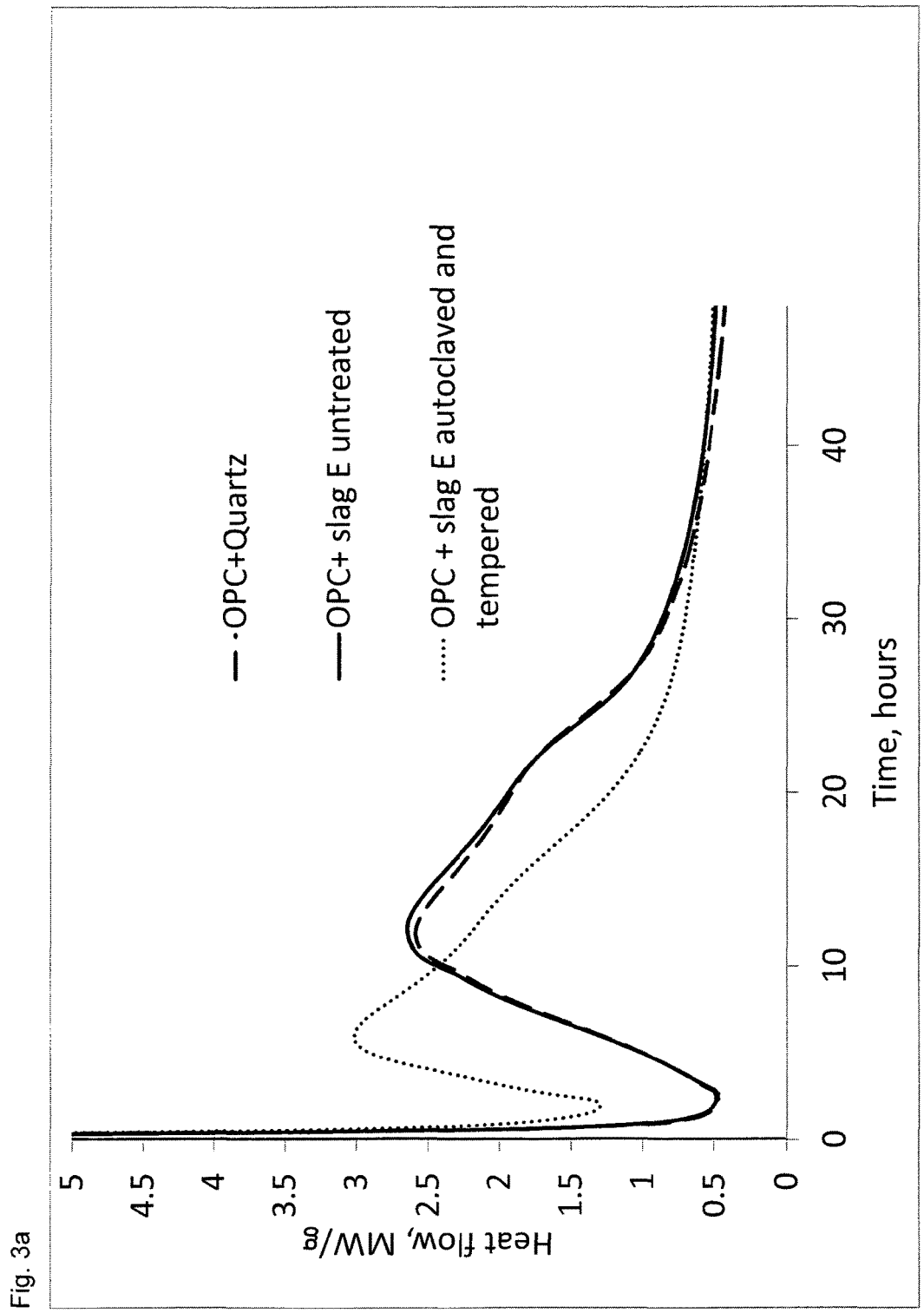
FIG. 3a shows measured heat flow according to Example 3.
Figure 3B:
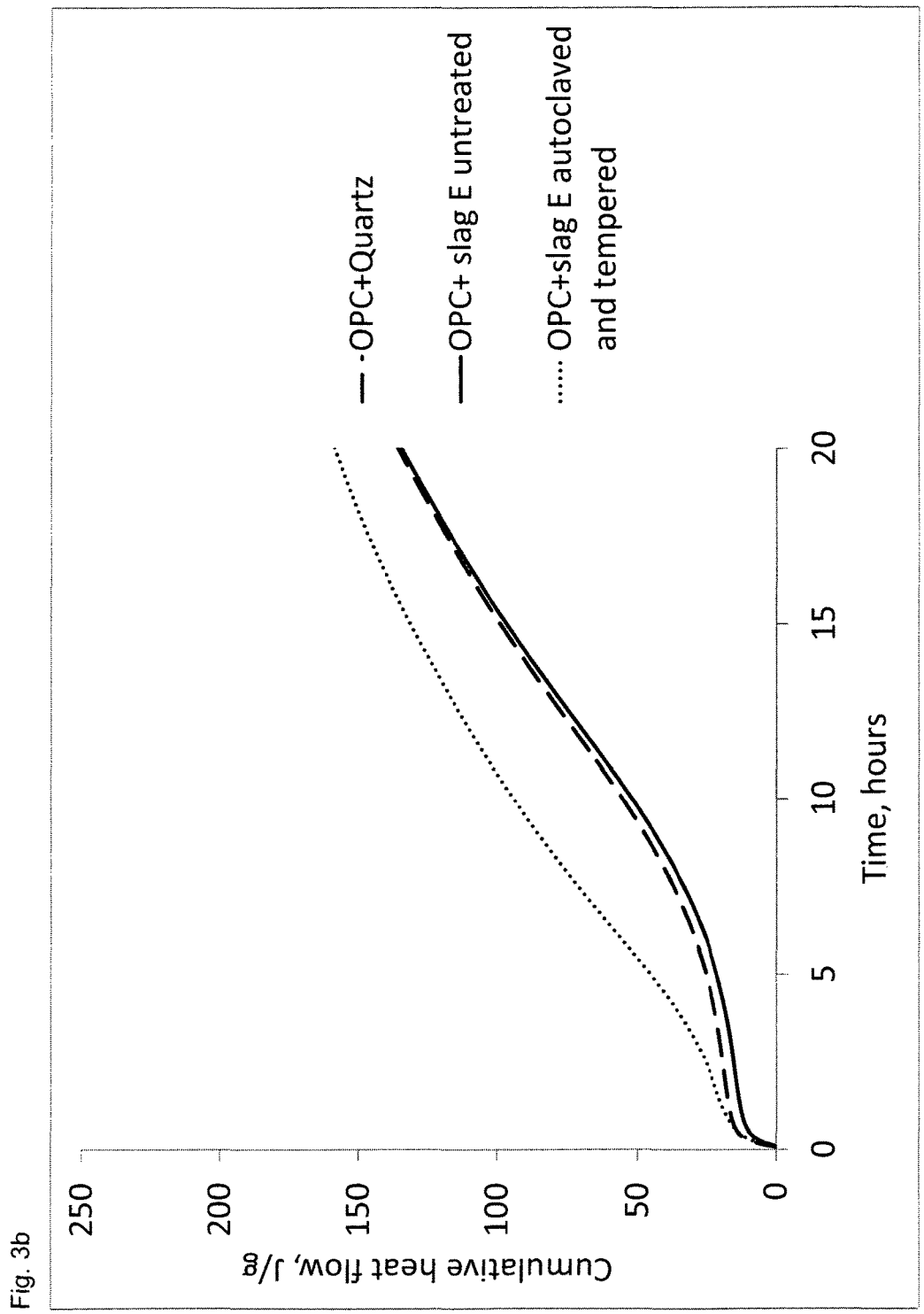
FIG. 3b shows cumulative heat flow according to Example 3.

Mixes of 70% OPC and 30% hydrothermally treated and tempered slag were mixed with water (water-to solid ratio of 0.5) and the heat flow development was measured by isothermal calorimetry (TAM Air, TA Instruments, Sweden). The results were compared to the heat flow recorded for mixes of 70% OPC and 30% non-treated slag and 70% OPC and 30% quartz. The measured heat flow and cumulative heat flow are shown in FIGS. 3a and 3b.

The heat evolution curves indicate a significant accelerating effect compared to blends of OPC with untreated material. Mixes of OPC with hydrothermally treated slag with subsequent tempering show a maximum rate of the heat release shifted to the left and a faster onset of the acceleration period. After 8 h, the cumulative heat output for the blend of OPC with hydrothermally treated and tempered slag is 52% higher compared to the blend of OPC with non-treated slag and by 25% higher at 16 h. The values remain greater after 7 days. This clearly shows the benefit that hydrothermal treatment followed by tempering has on the fairly reactive slags.

EXAMPLE 4

10 g of slag were added to water (water-to-solid (w/s) of 10) and hydrothermally treated at 185° C. for 16 h and 1.1 MPa in a stainless steel autoclave. 2% NaOH (solid/solid) was added to the solution before the autoclaving step to promote the dissolution of the glassy phases. The autoclaved product obtained was tempered for 1 h directly at 500° C.

The chemical composition including the loss on ignition at 1050° C. (LOI) of the used slag designated "M" is given in table 4. This slag is a fairly reactive material.

TABLE 4

| Component | amount [%] |
|---|---|
| $SiO_2$ | 35.84 |
| $Al_2O_3$ | 11.06 |
| $TiO_2$ | 0.99 |
| MnO | 0.34 |
| $Fe_2O_3$ | 0.44 |
| CaO | 38.99 |
| MgO | 8.19 |
| $K_2O$ | 0.49 |
| $Na_2O$ | 0.15 |
| $SO_3$ | 3.18 |
| $P_2O_5$ | 0.00 |
| Amorphous | 92.6 |
| Free lime | 0.00 |
| LOI | 1.37 |

Figure 4A:
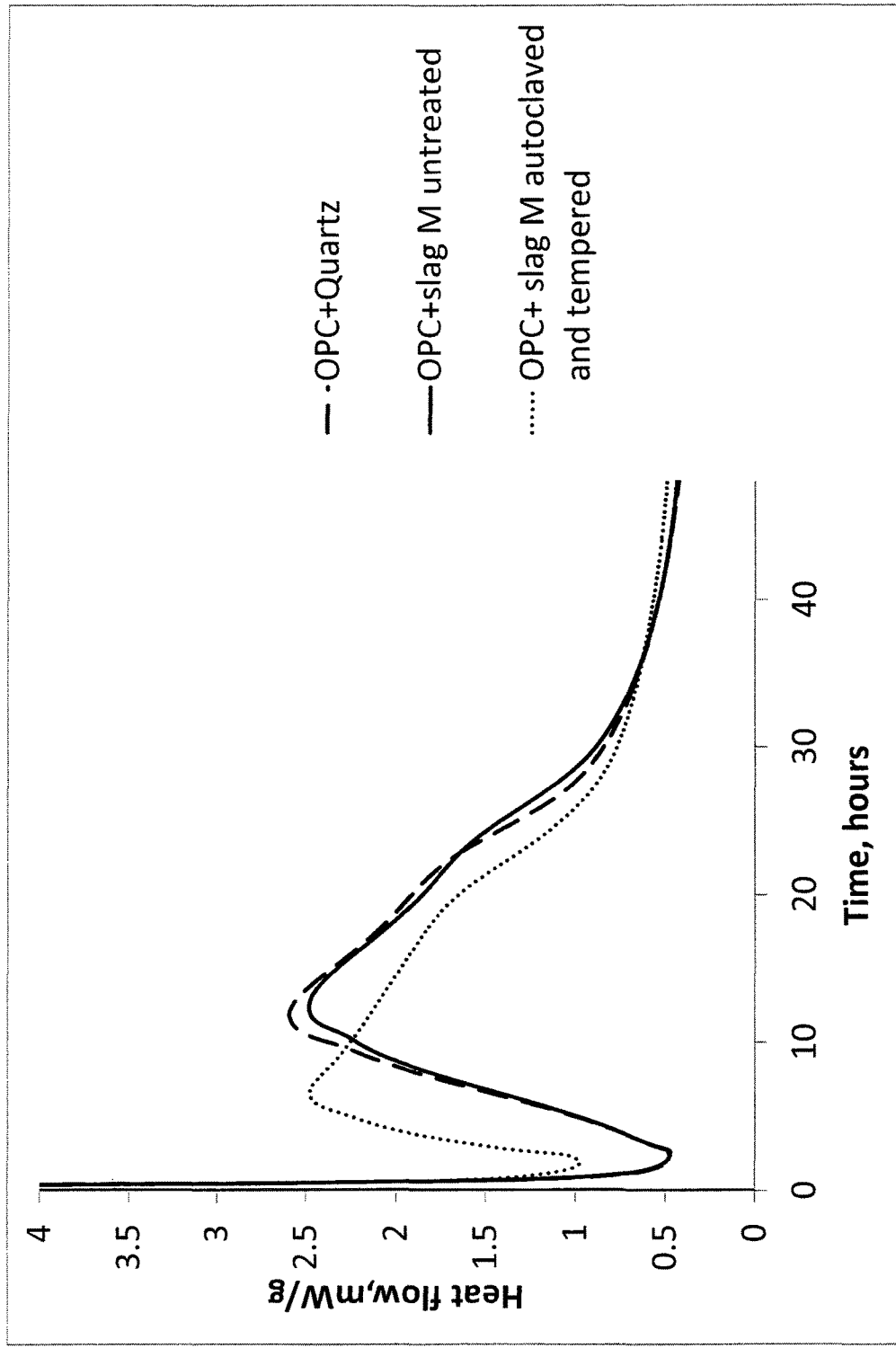
FIG. 4a shows measured heat flow according to Example 4.
Figure 4B:
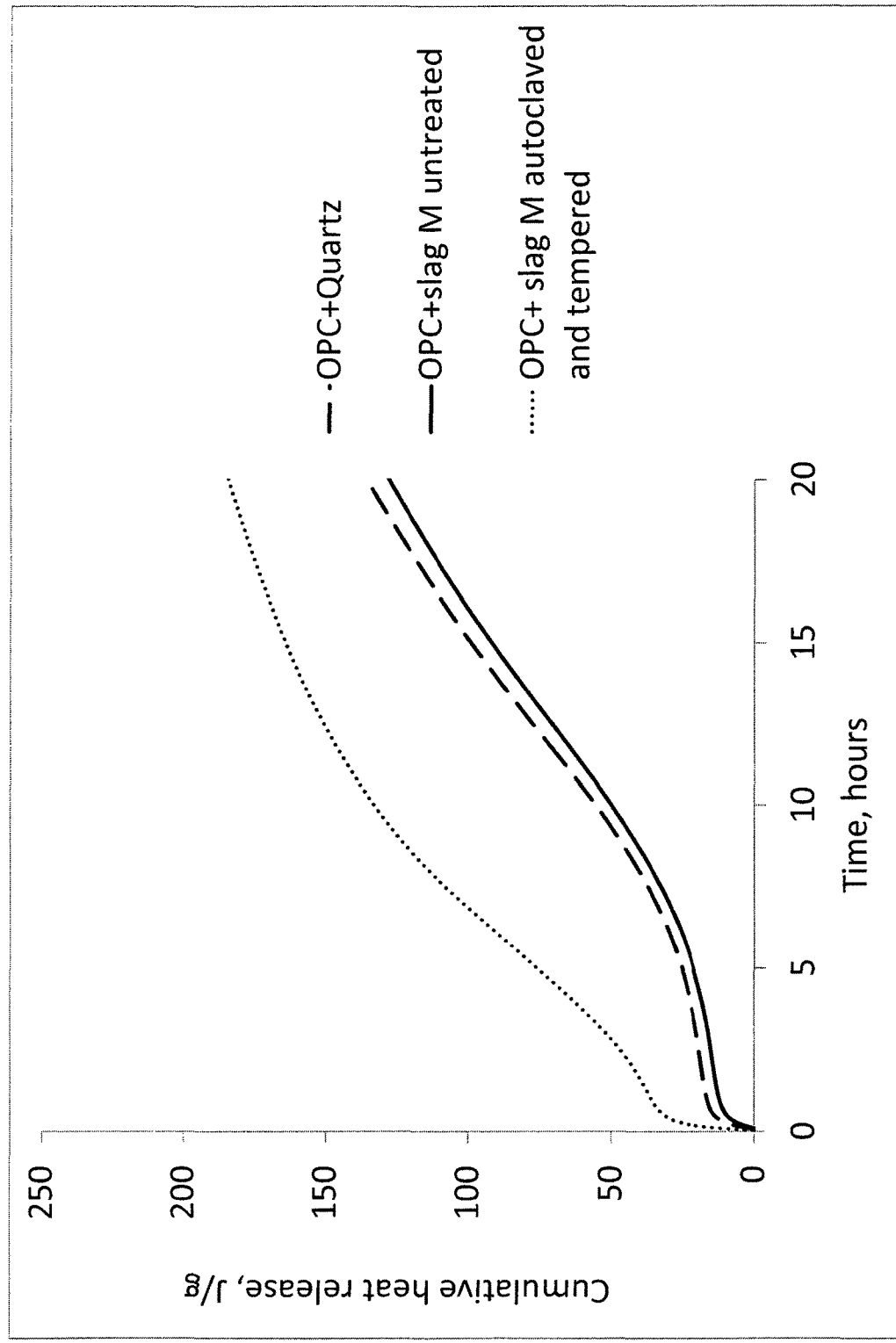
FIG. 4b shows cumulative heat flow according to Example 4.

Mixes of 70% OPC and 30% hydrothermally treated and tempered slag were mixed with water (water-to solid ratio of 0.5) and the heat flow development was measured by isothermal calorimetry (TAM Air, TA Instruments, Sweden). The results were compared to the heat flow recorded for mixes of 70% OPC and 30 non-treated slag and 70% OPC and 30% quartz. The measured heat flow and cumulative heat flow is shown in FIGS. 4a and 4b.

The heat evolution curves indicate a significant accelerating effect for the blend of OPC and treated material compared to the blend of OPC with untreated material. The mix of OPC with hydrothermally treated and tempered slag shows a maximum rate of the heat release shifted to the left and a faster onset of the acceleration period. After 8 h the cumulative heat output for the blend of OPC with hydrothermally treated and tempered slag are 64% higher compared to blends of OPC with non-treated slag and by 27% higher at 16 h. The values remain greater after 7 days. This clearly shows the benefit that hydrothermal treatment followed by tempering has on fairly reactive slags.

EXAMPLE 5

10 g of slag were added to water (water-to-solid (w/s) of 10) and hydrothermally treated at 185° C. and 1.1 MPa in a stainless steel autoclave once or twice for 16 h. 2% NaOH (solid/solid) was added to the solution before each autoclaving step to promote the dissolution of the glassy phases. The autoclaved product obtained was tempered for 1 h directly at 500° C.

The chemical composition including the loss on ignition at 1050° C. (LOI) of the used slag designated "I" is given in table 5.

TABLE 5

| Component | amount [%] |
|---|---|
| $SiO_2$ | 34.68 |
| $Al_2O_3$ | 13.43 |
| $TiO_2$ | 0.96 |
| MnO | 0.4 |
| $Fe_2O_3$ | 0.79 |
| CaO | 36.13 |
| MgO | 10.03 |
| $K_2O$ | 0.41 |
| $Na_2O$ | 0.24 |
| $SO_3$ | 2.75 |
| $P_2O_5$ | 0.01 |
| Amorphous | 98.6 |
| Free lime | 0.00 |
| LOI | 1.53 |

Figure 5A:
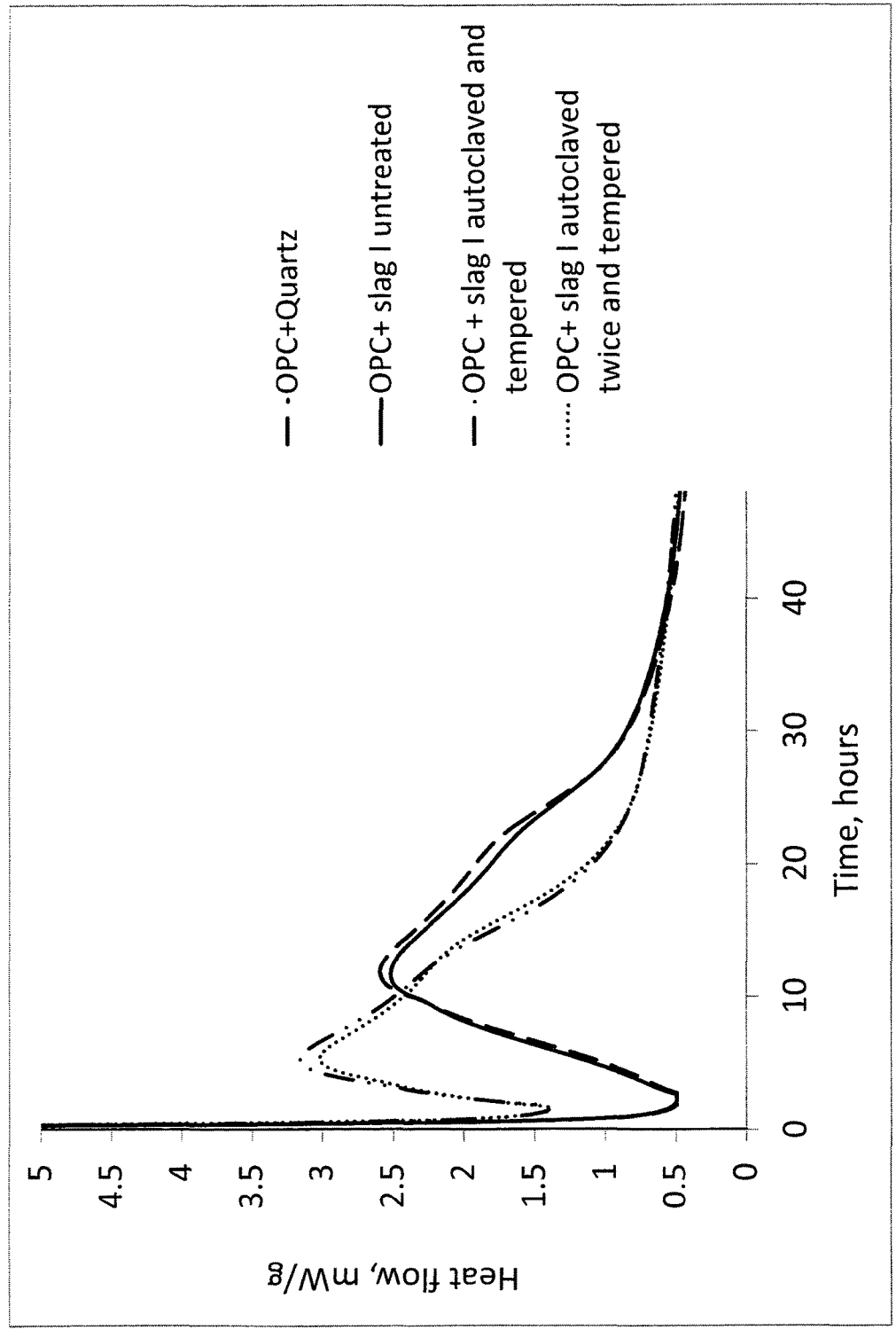
FIG. 5a shows measured heat flow according to Example 5.
Figure 5B:
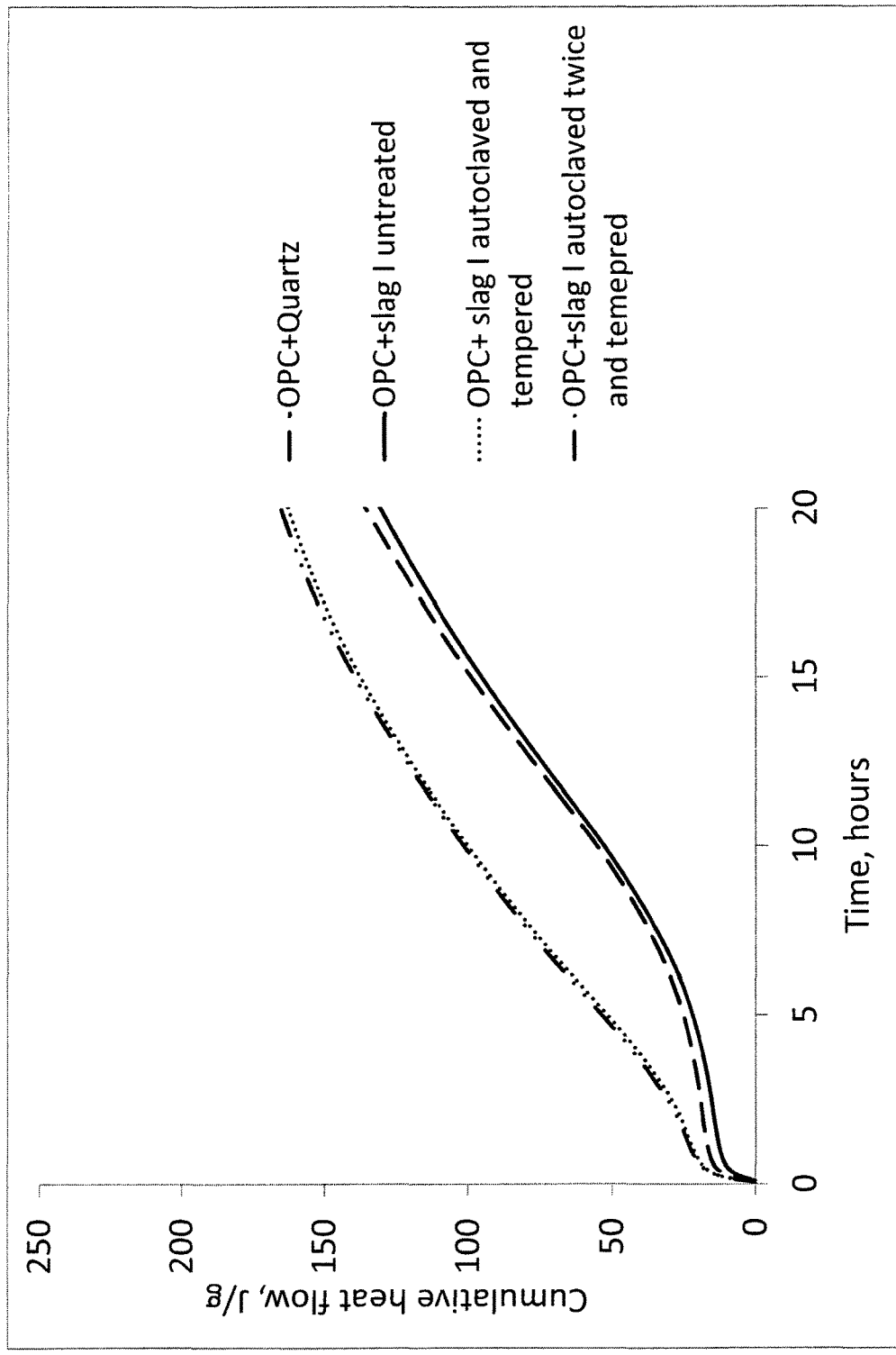
FIG. 5b shows cumulative heat flow according to Example 5.

Mixes of 70% OPC and 30% hydrothermally treated and tempered slag were mixed with water (water-to solid ratio of 0.5) and the heat flow development was measured by isothermal calorimetry (TAM Air, TA Instruments, Sweden). The results were compared to the heat flow recorded for mixes of 70% OPC and 30% non-treated slag and 70% OPC and 30% quartz. The measured heat flow and cumulative heat flow are shown in FIGS. 5a and 5b.

The heat evolution curves indicate a significant accelerating effect for blends of OPC with autoclaved and tempered material compared to blends of OPC with untreated material. The mixes of OPC with hydrothermally treated slag with subsequent tempering show the maximum rate of the heat release shifted to the left and a faster onset of the acceleration period. After 8 h the cumulative heat output for the blend of OPC with hydrothermally treated and tempered slag are 125% higher compared to blends of OPC with non-treated slag and by 43% higher at 16 h. The values remain greater after 7 days. This clearly shows the benefit that hydrothermal treatment followed by tempering has on reactive slags.

EXAMPLE 6

10 g of fly ash were added to water (water-to-solid (w/s) of 10) and hydrothermally treated at 185° C. and 1.1 MPa in a stainless steel autoclave two times for 16 h. 2% NaOH (solid/solid) was added to the solution before each autoclaving step to promote the dissolution. The autoclaved product obtained was tempered for 1 h directly at 500° C.

The chemical composition including the loss on ignition at 1050° C. (LOI) of the used fly ash designated "F" is given in table 6. This fly ash has a high free lime content and a high crystalline content so that it is not suitable to be used as SCM.

TABLE 6

| Component | amount [%] |
|---|---|
| $SiO_2$ | 17.04 |
| $Al_2O_3$ | 2.32 |
| $TiO_2$ | 0.16 |
| MnO | 0.32 |
| $Fe_2O_3$ | 13.75 |
| CaO | 40.46 |
| MgO | 4.56 |
| $K_2O$ | 0.31 |
| $Na_2O$ | 1.186 |
| $SO_3$ | 14.94 |
| $P_2O_5$ | 0.017 |
| Amorphous | 1.53 |
| Free lime | 21.6 |
| LOI | 3.17 |

Figure 6A:
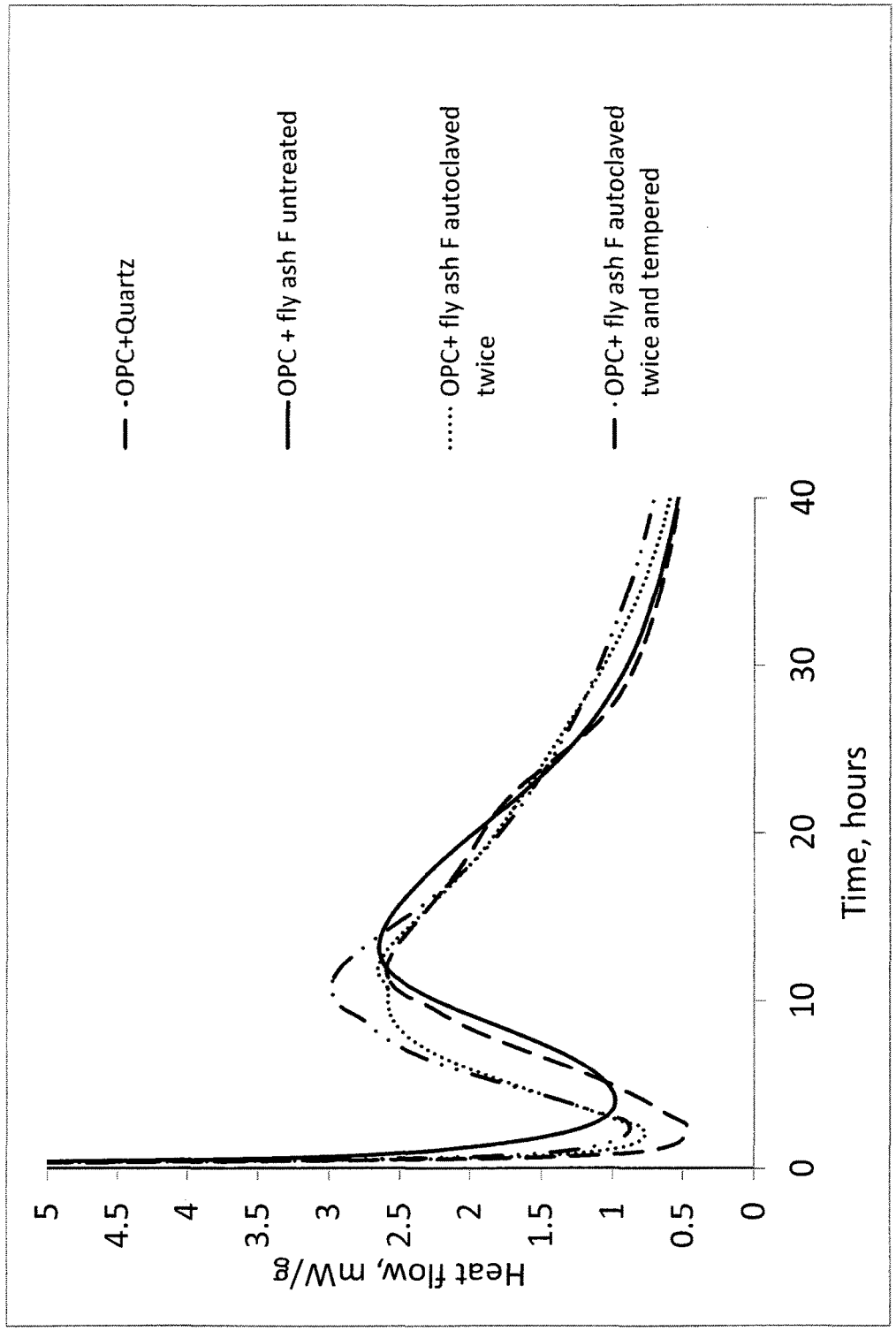
FIG. 6a shows measured heat flow according to Example 6.
Figure 6B:
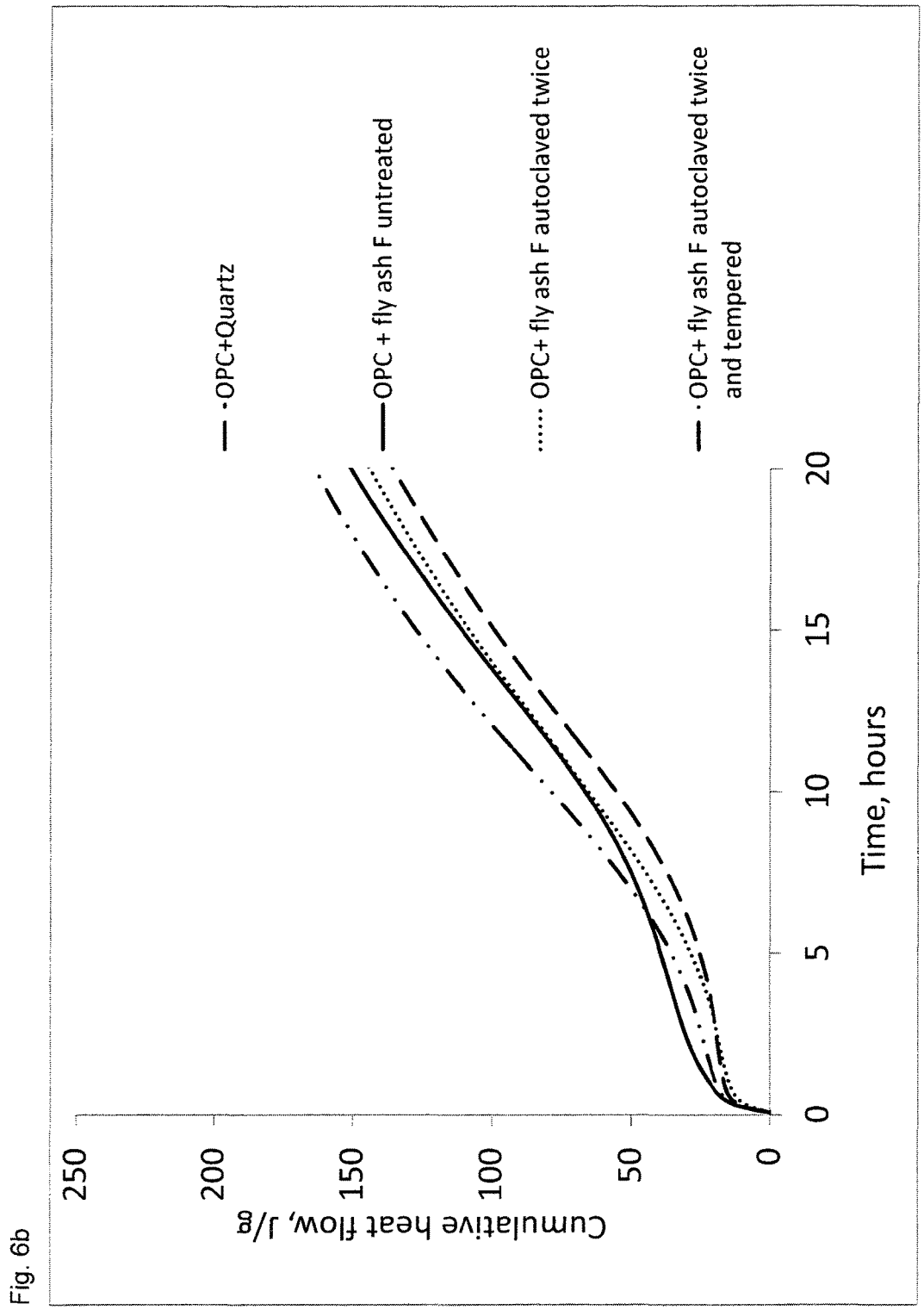
FIG. 6b shows cumulative heat flow according to Example 6.

Blends of 70% OPC and 30% hydrothermally treated fly ash and hydrothermally treated fly ash with subsequent tempering were mixed with water (water-to solid ratio of 0.5) and the heat flow development was measured by isothermal calorimetry (TAM Air, TA Instruments, Sweden). The results were compared to the heat flow recorded for mixes of 70% OPC and 30% non-treated fly ash and 70% OPC and 30% quartz. The measured heat flow and cumulative heat flow are shown in FIGS. 6a and 6b.

The heat evolution curves indicate an accelerating effect for blends of OPC with treated material compared to blends of OPC with untreated material. The mixes of OPC with hydrothermally treated fly ash show the maximum rate of the heat release shifted to the left and a faster onset of the acceleration period. Subsequent tempering leads to further acceleration compared to OPC. After 8 h the cumulative heat output for the blend of OPC with hydrothermally treated and tempered fly ash are 14% higher compared to blends of OPC with non-treated fly ash. At 16 h the values are 10% higher. The values remain 11% greater after 7 days. This clearly shows the benefit that hydrothermal treatment followed by tempering has on the low reactive fly ashes.

EXAMPLE 7

10 g of fly ash were added to water (water-to-solid (w/s) of 10) and hydrothermally treated at 185° C. and 1.1 MPa in a stainless steel autoclave two times for 16 h. 2% NaOH (solid/solid) was added to the solution before each autoclaving step to promote the dissolution. The autoclaved product was tempered for 1 h directly at 500° C.

The chemical composition including the loss on ignition at 1050° C. (LOI) of the used fly ash designated "B" is given in table 7. This fly ash has a high CaO content rendering its use as SCM problematic.

TABLE 7

| Component | amount [%] |
|---|---|
| $SiO_2$ | 35.7 |
| $Al_2O_3$ | 21.6 |
| $TiO_2$ | 1.21 |
| MnO | 0.03 |
| $Fe_2O_3$ | 6.02 |
| CaO | 25.50 |
| MgO | 1.34 |
| $K_2O$ | 0.13 |
| $Na_2O$ | 0.07 |
| $SO_3$ | 3.96 |
| $P_2O_5$ | 0.15 |
| Amorphous | 47.96 |
| Free lime | 2.4 |
| LOI | 3.48 |

Figure 7A:
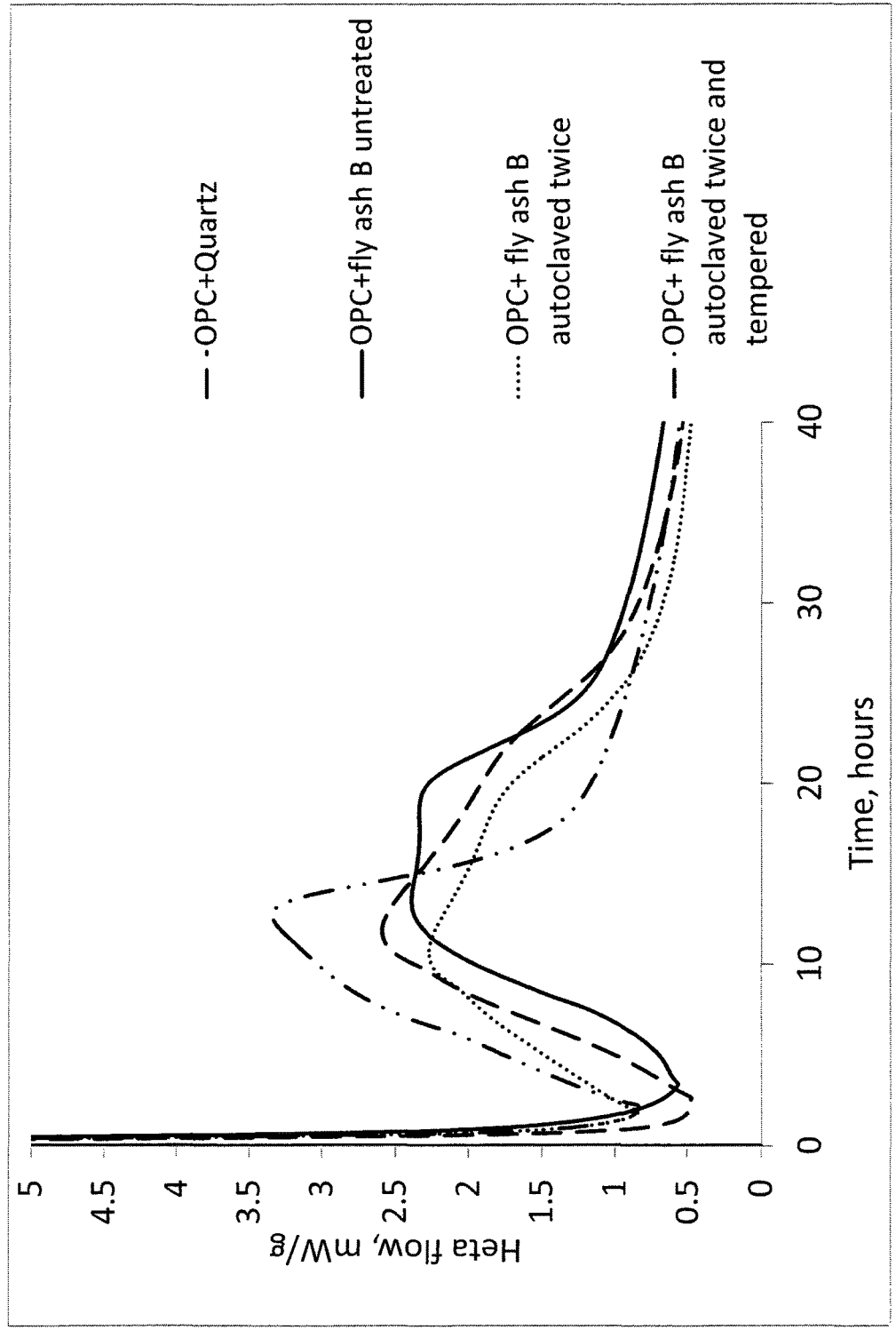
FIG. 7a shows measured heat flow according to Example 7.
Figure 7B:
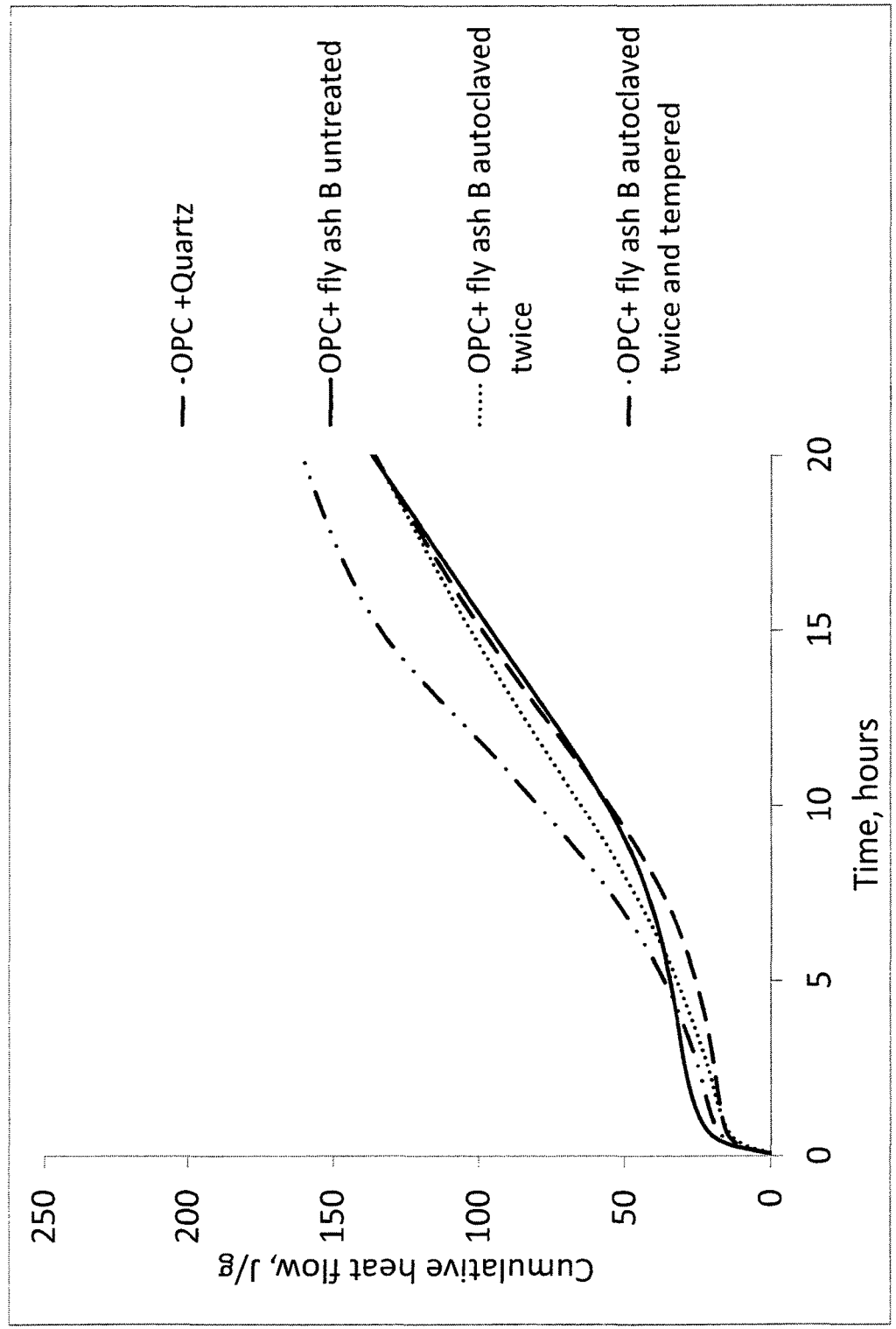
FIG. 7b shows cumulative heat flow according to Example 7.

Blends of 70% OPC and 30% twice hydrothermally treated fly ash and twice hydrothermally treated fly ash with subsequent tempering were mixed with water (water-to solid ratio of 0.5) and the heat flow development was measured by isothermal calorimetry (TAM Air, TA Instruments, Sweden). The results were compared to the heat flow recorded for mixes of 70% OPC and 30% non-treated fly ash and 70% OPC and 30% quartz. The measured heat flow and cumulative heat flow are shown in FIGS. 7a and 7b.

The heat evolution curves indicate an accelerating effect for blends of OPC and treated material compared to blends of OPC with untreated material. The mixes of OPC with hydrothermally treated fly ash show the maximum rate of the heat release shifted to the left and a faster onset of the acceleration period. Subsequent tempering leads to further acceleration and to an increase in the rate of the maximum heat release compared to OPC. After 8 h the cumulative heat output for the blend of OPC with hydrothermally treated and tempered fly ash are 35% higher compared to blends of OPC with non-treated fly ash. At 16 h the values are 31% higher. The values are not higher after 7 days. This clearly shows the benefit that hydrothermal treatment followed by tempering has on the low reactive fly ashes.

EXAMPLE 8

10 g of a mix of the two fly ashes "F" and "B" was added to water (water-to-solid (w/s) of 10) and hydrothermally treated at 185° C. for 16 h and 1.1 MPa in a stainless steel autoclave. 2% NaOH (solid/solid) was added to the solution before the autoclaving step to promote the dissolution. The hydrated product obtained was tempered for 1 h directly at 500° C.

The chemical compositions of fly ashes "F" and "B" are presented in table 6 and table 7. The composition of the mixes chosen to be autoclaved is given in table 8.

TABLE 8

|  | Fly ash + B | Fly ash + F |
|---|---|---|
| Mix 25/75 | 25% | 75% |
| Mix 50/50 | 50% | 50% |
| Mix 75/25 | 75% | 25% |

Figure 8A:
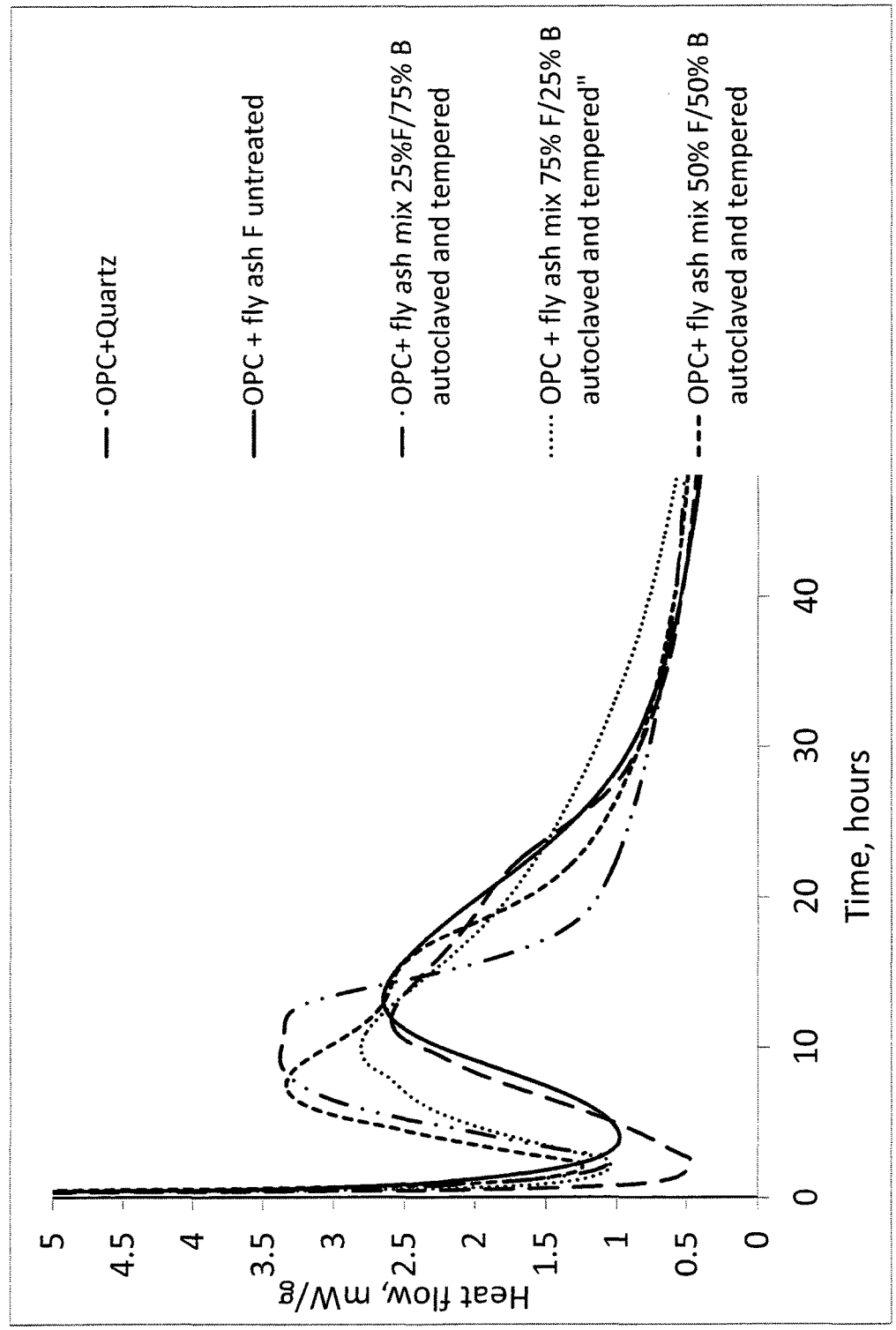
FIG. 8a shows measured heat flow according to Example 8.
Figure 8B:
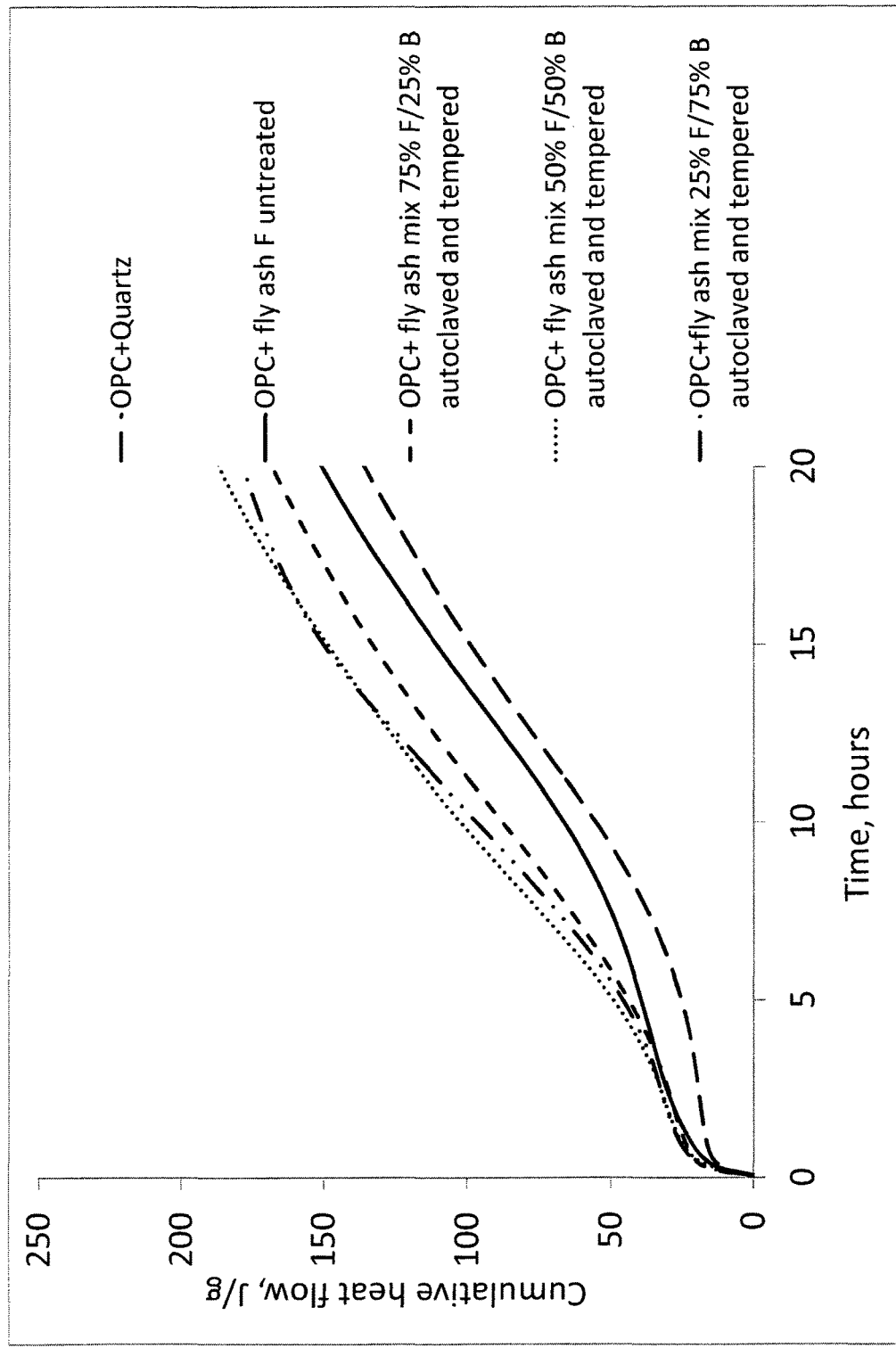
FIG. 8b shows cumulative heat flow according to Example 8.

Blends of 70% OPC and 30% hydrothermally treated mixes of fly ashes with subsequent tempering were mixed with water (water-to solid ratio of 0.5) and the heat flow development was measured by isothermal calorimetry (TAM Air, TA Instruments, Sweden). The results were compared to the heat flow recorded for blends of 70% OPC and 30% non-treated individual fly ash and 70% OPC and 30% quartz. The measured heat flow and cumulative heat flow are shown in FIGS. 8a and 8b.

The heat evolution curves indicate an accelerating effect for blends of OPC and treated material compared to blends of OPC with untreated material. The mixes of OPC with hydrothermally treated and tempered fly ashes show a higher maximum rate of the heat release which is additionally shifted to the left and a faster onset of the acceleration period. After 8 h the cumulative heat output for the blend of OPC with hydrothermally treated and tempered fly ashes are from 30 to 59% higher compared to blends of OPC with non-treated fly ash. At 16 h the values are 19 to 37% higher. The values remain greater after 7 days. This clearly shows the benefit that hydrothermal treatment followed by tempering has on the low reactive fly ashes.

EXAMPLE 9

A raw meal consisting of 49.97% portlandite, 25.015% slag and 25.015% fly ash was added to water (water-to-solid (w/s) of 10) and hydrothermally treated at 185° C. for 16 h and 1.1 MPa in a stainless steel autoclave. The autoclaved product was tempered for 1 h directly at 500° C.

The chemical compositions and loss on ignition at 1050° C. (LOI) of the fly ash, slag and portlandite are listed in table 9.

TABLE 9

| Component | Portlandite | Slag amount [%] | Fly ash |
|---|---|---|---|
| $SiO_2$ | | 35.84 | 56.35 |
| $Al_2O_3$ | | 11.06 | 21.63 |
| $TiO_2$ | | 0.99 | 0.97 |
| MnO | | 0.34 | 0.04 |
| $Fe_2O_3$ | | 0.44 | 6.95 |
| CaO | 75.67 | 38.99 | 4.08 |
| MgO | | 8.19 | 1.86 |
| $K_2O$ | | 0.49 | 1.6 |
| $Na_2O$ | | 0.15 | 0.81 |
| $SO_3$ | | 3.18 | 0.022 |
| $P_2O_5$ | | 0.00 | 0.39 |
| Amorphous | | 92.6 | 62.5 |
| Free lime | | 0.00 | 0.5 |
| LOI | 24.33 | 1.37 | 3.87 |

Figure 9A:
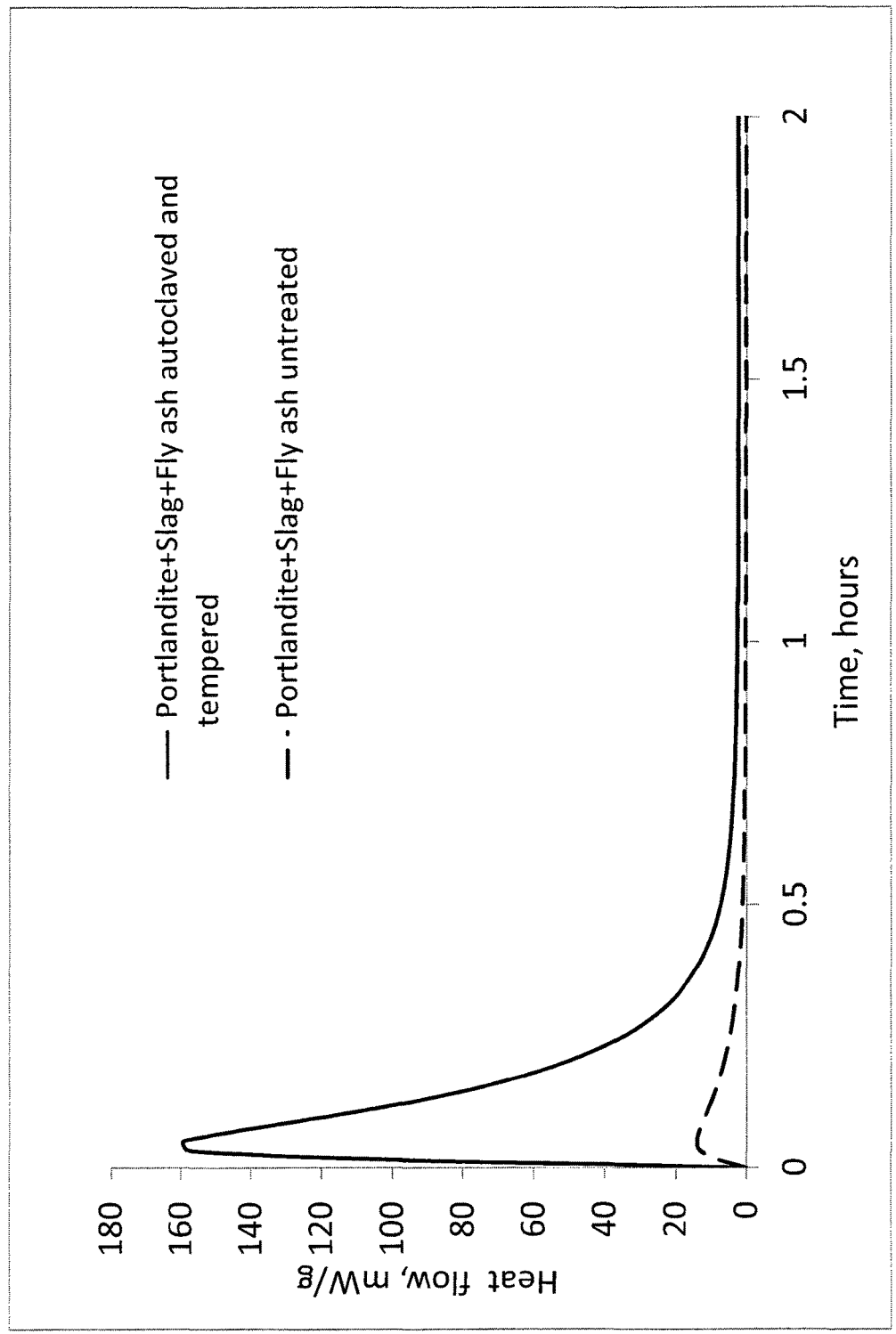
FIG. 9a shows measured heat flow according to Example 9.
Figure 9B:
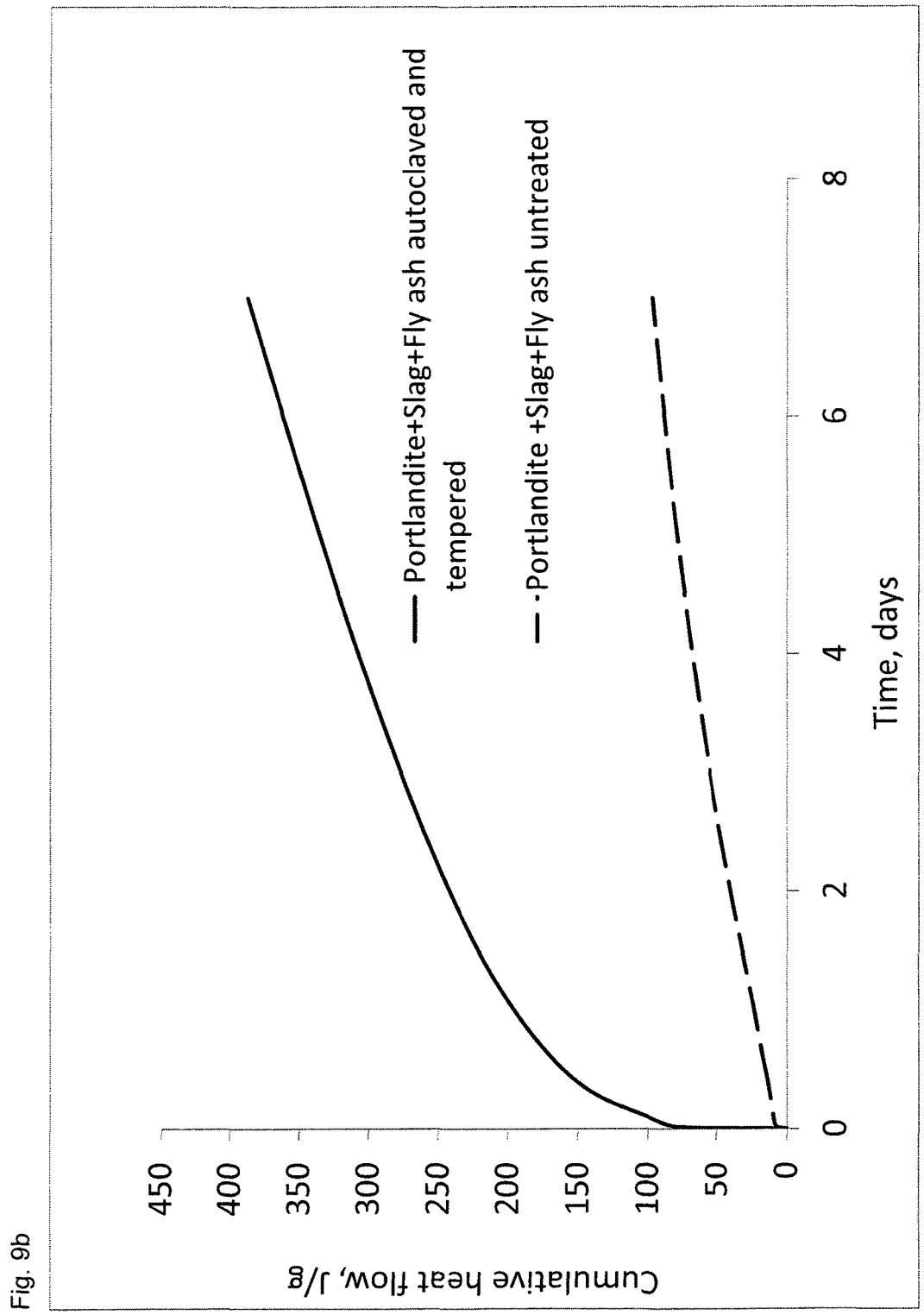
FIG. 9b shows cumulative heat flow according to Example 9.

Mixes of fly ash, slag and portlandite with and without hydrothermal treatment with subsequent tempering were mixed with water (water-to solid ratio of 0.5) and the heat flow development was measured by isothermal calorimetry (TAM Air, TA Instruments, Sweden). The measured heat flow and cumulative heat flow are shown in FIGS. 9a and 9b.

The heat development measurements indicate that after hydrothermal treatment followed by tempering the blend of fly ash, slag and portlandite releases substantially higher heat over all the measuring time. This clearly shows that SCMs can benefit from hydrothermal treatment followed by tempering.

EXAMPLE 10

A mix 1 consisting of 30.77% portlandite, 19.18% brucite and 50.06% fly ash was added to water (water-to-solid (w/s) of 10) and hydrothermally treated at 185° C. for 16 h and 1.1 MPa in a stainless steel autoclave. The autoclaved product was tempered for 1 h directly at 500° C.

A mix 2 consisting of 25.87% portlandite and 74.13% fly ash was added to water (water-to-solid (w/s) of 10) and hydrothermally treated at 185° C. for 16 h and 1.1 MPa in a stainless steel autoclave. The autoclaved product was tempered for 1 h directly at 500° C.

The chemical composition and loss on ignition (LOI) at 1050° C. of the starting materials fly ash designated "K", brucite and portlandite is listed in table 10.

TABLE 10

| Component | Portlandite | Brucite amount [%] | Fly-ash K |
|---|---|---|---|
| $SiO_2$ | | | 42.98 |
| $Al_2O_3$ | | | 19.96 |
| $TiO_2$ | | | 0.66 |
| MnO | | | 0.04 |
| $Fe_2O_3$ | | | 8.41 |
| CaO | 75.67 | | 21.4 |
| MgO | | 68.96 | 2.24 |
| $K_2O$ | | | 1.47 |
| $Na_2O$ | | | 0.27 |
| $SO_3$ | | | 1.55 |
| $P_2O_5$ | | | 0.25 |
| Amorphous | | | 82.7 |
| Free lime | | | 3.4 |
| LOI | 24.33 | 31.04 | 0.05 |

Figure 10A:
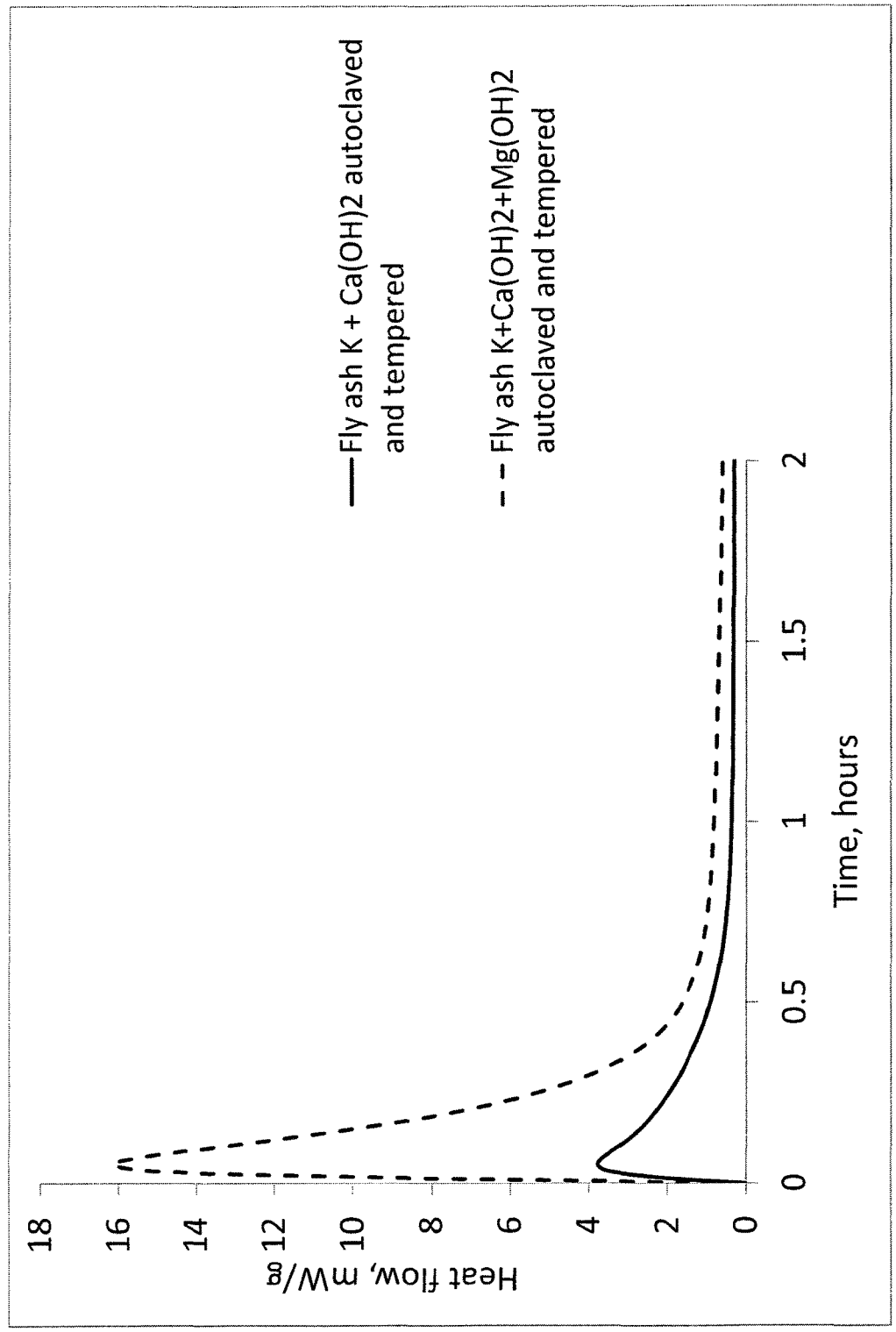
FIG. 10a shows measured heat flow according to Example 10.
Figure 10B:
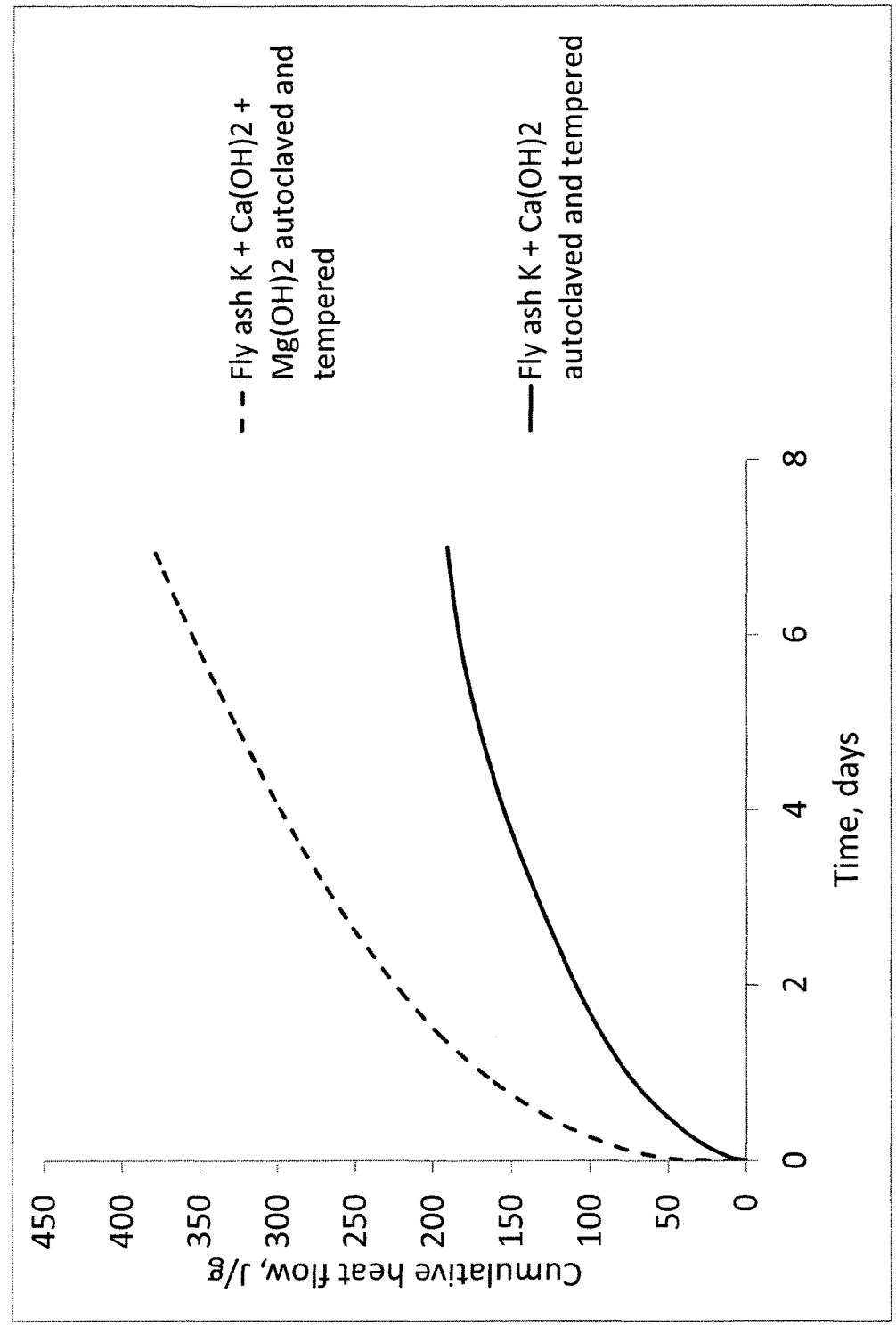
FIG. 10b shows cumulative heat flow according to Example 10.

The autoclaved and tempered mixes of fly ash, slag and portlandite were mixed with water (water-to solid ratio of 0.5) and the heat flow development was measured by isothermal calorimetry (TAM Air, TA Instruments, Sweden). The measured heat flow and cumulative heat flow are shown in FIGS. 10a and 10b. It can be seen that the autoclaved and tempered products show a high reactivity.

EXAMPLE 11

A raw meal consisting of 44.55% brucite and 55.46% fly ash K was added to water (water-to-solid (w/s) of 10) and hydrothermally treated at 185° C. for 16 h and 1.1 MPa in a stainless steel autoclave. The autoclaved product was tempered for 1 h directly at 500° C. The chemical composition and loss on ignition (LOI) at 1050° C. of the starting materials fly ash and brucite is found in table 10.

Figure 11A:
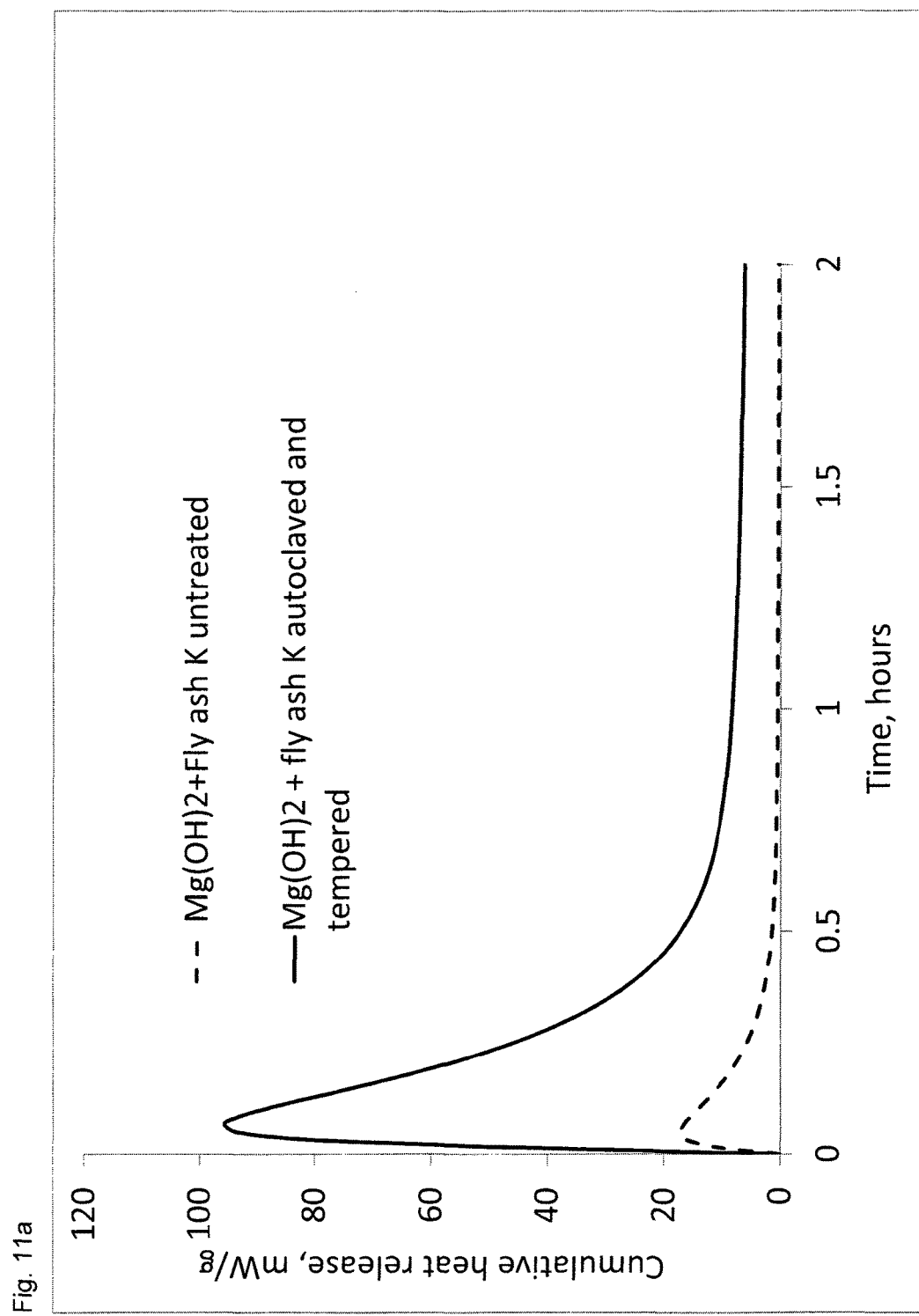
FIG. 11a shows measured heat flow according to Example 11.
Figure 11B:
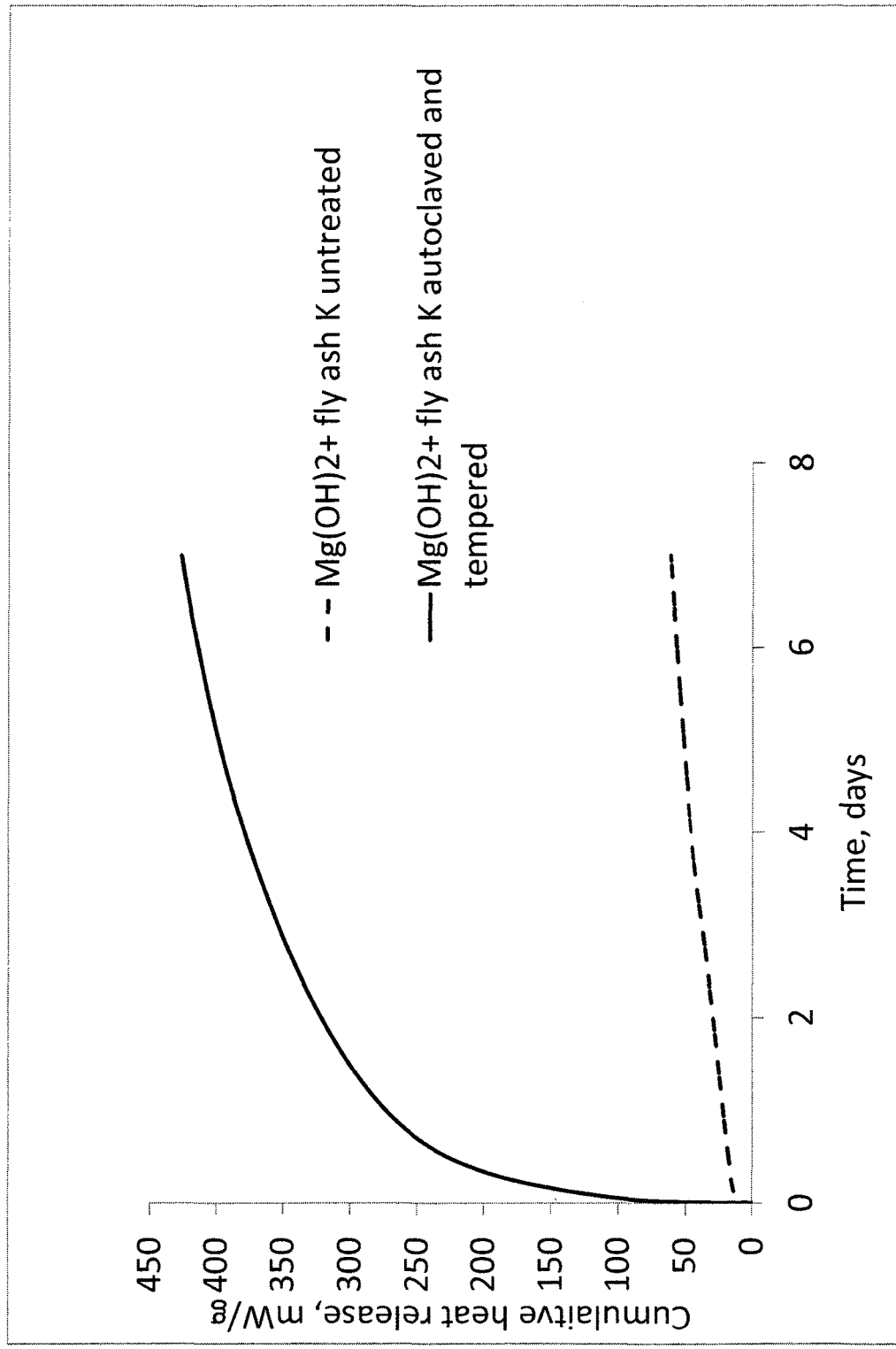
FIG. 11b shows cumulative heat flow according to Example 11.

Mixes of fly ash and brucite with and without hydrothermal treatment with subsequent tempering were mixed with water (water-to solid ratio of 0.5) and the heat flow development was measured by isothermal calorimetry (TAM Air, TA Instruments, Sweden). The measured heat flow and cumulative heat flow are shown in FIGS. 11a and 11b.

The heat development measurements indicated that, after hydrothermal treatment followed by tempering, the blend of fly ash and brucite releases substantially higher heat over all the measuring time. This clearly shows the enhanced reactivity of SCMs resulting from hydrothermal treatment followed by tempering.

The invention claimed is:

1. A method of enhancing the latent hydraulic and/or pozzolanic reactivity of a material comprising the steps:
   providing a starting material containing sources for CaO and at least one of $SiO_2$ and $Al_2O_3$,
   mixing the starting material with water at a water/solids ratio from 0.1 to 100,
   hydrothermal treating of the starting material mixed with water in an autoclave at a temperature of 100 to 300° C. and a residence time from 0.1 to 50 hours to provide an autoclaved product with hydraulic, pozzolanic, or latent hydraulic reactivity, and
   grinding the autoclaved product to a fineness of 2,000 to 10,000 cm$^2$/g.

2. The method according to claim 1, wherein the starting material has a molar ratio Ca/(Si+Al+Fe) from 1.5 to 3.

3. The method according to claim 2, wherein the required ratio Ca/(Si+Al+Fe) is adjusted by adding further reactants before treatment begins.

4. The method according to claim 1, wherein the starting material is selected from the group consisting of high calcium fly ash (calcium content of Class C fly ash), low calcium fly ash (calcium content of Class F fly ash), incineration ash from combustion of municipal wastes both solid and liquid, bottom ash, slag, quartz, sand, gravel, used concrete, asbestos, and mixtures thereof.

5. The method according to claim 1, further comprising mechanically treating the starting material to optimize particle size and particle size distribution.

6. The method according to claim 1, wherein further elements or oxides are added in an amount of 0.1 to 30% by weight while mixing the starting materials or in a subsequent step.

7. The method according to claim 6, wherein the further elements are selected from the group consisting of $CaSO_4 \cdot \frac{1}{2} H_2O$, $CaSO_4$, $CaHPP_2 \cdot 2H_2O$, $Ca_3P_2O_8$, $NaOH$, $KOH$, $Na_2CO_3$, $K_2CO_3$, $MgCO_3$, $MgSO_4$, $Na_2Al_2O_4$, $Na_3PO_4$, $K_3PO_4$, $Na_2[B_4O_5(OH)_4]$ 108 $8H_2O$, $CaCl_2$, $Ca(NO_3)_2$, $MgCl_2$, $Mg(NO_3)_2$, $AlCl_3$, $Al(NO_3)_3$, $FeCl_3$, $Fe(NO_3)_3$, $Ca(CH_3COO)_2$, $Mg(CH_3COO)_2$, $Al(CH_3COO)_3$, $Ca(HCOO)_2$, $Mg(HCOO)_2$, $Al(HCOO)_3$, and mixtures thereof.

8. The method according to claim 1, wherein the starting material mixture is seeded with seed crystals which contain calcium silicate hydrate, Portland clinker, granulated blast furnace slag, magnesium silicates, calcium sulphate aluminate (belite) cement, sodium silicate, and/or glass powder.

9. The method according to claim 1, wherein hydrothermal treatment in the autoclave is carried out at a temperature from 150 to 250° C.

10. The method according to claim 1, wherein the starting material has a molar ratio Ca/(Si+Al+Fe) from 1.5 to 2.5.

11. The method according to claim 1, wherein hydrothermal treatment in the autoclave is carried out for 16 to 32 hours.

12. The method according to claim 1, where hydrothermal treatment in the autoclave is carried out for 10 to 40 hours.

13. The method according to claim 1, wherein the autoclaved product has enhanced hydraulic, pozzolanic, or latent hydraulic reactivity as compared to the starting material.

14. A method of enhancing the latent hydraulic or pozzolanic reactivity of a material, comprising the steps:
providing a starting material containing sources of CaO and at least one of $SiO_2$ and $Al_2O_3$,
mixing the starting material with water at a water/solids ratio from 0.1 to 100,
hydrothermal treating of the starting material mixed with water in an autoclave at a temperature of 100 to 300 ° C. and a residence time from 0.1 to 50 hours to provide an autoclaved product,
tempering the autoclaved product at a temperature ranging from 350 to 600 ° C. to provide an autoclaved product with pozzolanic or latent hydraulic reactivity, and
grinding the autoclaved and tempered product to a fineness of 2,000 to 10,000 cm²/g.

15. The method according to claim 14, wherein the heating rates are from 10 to 6000° C./minute.

16. The method according to claim 14, wherein the residence time in the tempering step is from 0.01 to 600 minute.

17. The method according to claim 14, wherein an additional holding time of 1 to 120 minutes, during at 400 to 400° C., is performed during the tempering.

18. The method according to claim 14, wherein the starting material is selected from the group consisting of high calcium fly ash (calcium content of Class C fly ash), low calcium fly ash (calcium content of Class F fly ash), incineration ash from combustion of municipal wastes both solid and liquid, bottom ash, slag, quartz, sand, gravel, used concrete, asbestos, and mixtures thereof.

19. The method according to claim 14, wherein the autoclaved product is tempered at a temperature from 400 to 550° C.

20. The method according to claim 11, wherein the autoclaved product is tempered at a temperature from 400 to 495° C.

21. The method according to claim 11, wherein a heating rates are from 20 to 100° C./minute.

22. The method according to claim 11, wherein a residence time in the tempering step is from 1 to 120 minutes.

23. The method according to claim 11, wherein the residence time in the tempering step is from 5 to 60 minutes.

24. The method according to claim 11, wherein an additional holding time of 10 to 60 minutes, during heating at 400 to 440° C., is performed during tempering.

25. The method according to claim 11, wherein the starting material has a molar ratio Ca/(Si+Al+Fe) ranging from 1.5 to 2.5 of about 2.

26. The method according to claim 11, wherein hydrothermal treatment in the autoclave is carried out at a temperature ranging from 150 to 250 ° C.

27. The method according to claim 14, further comprising mechanically treating the starting material to optimize particle size and particle size distribution.

28. The method according to claim 14, wherein further elements or oxides, sodium, potassium, boron, sulphur, phosphorous, or a combination thereof, are added in an amount of 0.1 to 30% by weight while mixing the starting materials or in a subsequent step.

29. The method according to claim 14, wherein the starting material mixture is seeded with seed crystals which contain calcium silicate hydrate, Portland clinker, granulated blast furnace slag, magnesium silicates, calcium sulphate aluminate (belite) cement, sodium silicate, glass powder, or mixtures thereof.

30. The method according to claim 14, wherein the starting material has a molar ratio Ca/(Si+Al+Fe) from 1.5 to 2.5.

31. The method according to claim 11, wherein hydrothermal treatment in the autoclave is carried out for 16 to 32 hours.

* * * * *